(12) United States Patent
Ran

(10) Patent No.: US 11,994,918 B2
(45) Date of Patent: May 28, 2024

(54) ELECTRONIC DEVICE CONTROL METHOD AND ELECTRONIC DEVICE

(71) Applicant: Huawei Technologies Co., Ltd., Shenzhen (CN)

(72) Inventor: Yan Ran, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 10 days.

(21) Appl. No.: 17/707,268

(22) Filed: Mar. 29, 2022

(65) Prior Publication Data

US 2022/0283610 A1  Sep. 8, 2022

Related U.S. Application Data

(63) Continuation of application No. PCT/CN2020/117318, filed on Sep. 24, 2020.

(30) Foreign Application Priority Data

Sep. 30, 2019 (CN) .................. 201910939210.X

(51) Int. Cl.
*G06F 1/16* (2006.01)
(52) U.S. Cl.
CPC .......... *G06F 1/1677* (2013.01); *G06F 1/1652* (2013.01); *G06F 1/1694* (2013.01)
(58) Field of Classification Search
CPC ..... G06F 1/1677; G06F 1/1652; G06F 1/1694
See application file for complete search history.

(56) References Cited

U.S. PATENT DOCUMENTS

| 2010/0001967 A1* | 1/2010 | Yoo ...................... G06F 3/04817 715/833 |
| 2010/0064244 A1* | 3/2010 | Kilpatrick, II ...... H04M 1/0243 345/1.3 |
| 2012/0243206 A1* | 9/2012 | Wang ........................ G09F 9/30 362/97.1 |
| 2012/0280917 A1* | 11/2012 | Toksvig ................ G06F 1/1626 345/173 |
| 2012/0311499 A1* | 12/2012 | Dellinger ............. H04N 23/632 715/835 |
| 2013/0069897 A1* | 3/2013 | Liu ......................... H04M 1/67 345/173 |
| 2013/0080970 A1* | 3/2013 | Sirpal ....................... G06F 9/44 715/790 |
| 2013/0097668 A1* | 4/2013 | Park ..................... G06F 3/0488 726/2 |

(Continued)

FOREIGN PATENT DOCUMENTS

| AU | 2012316485 A1 * | 3/2014 | ........... G06F 1/1626 |
| CN | 201986002 U * | 9/2011 | |

(Continued)

*Primary Examiner* — Shahid K Khan
(74) *Attorney, Agent, or Firm* — Conley Rose, P.C.

(57) ABSTRACT

An electronic device control method includes receiving a screen-on instruction from a user on the electronic device. When a first display screen is in a target orientation an icon of at least one first application is displayed on the first display screen. The first application can be opened when the electronic device is in a locked state. When a second display screen of the electronic device is in a target orientation, a lock screen interface is displayed on the second display screen.

20 Claims, 18 Drawing Sheets

(56) References Cited

U.S. PATENT DOCUMENTS

| | | | | |
|---|---|---|---|---|
| 2013/0117698 | A1* | 5/2013 | Park | G06F 3/04883 715/765 |
| 2013/0132877 | A1* | 5/2013 | Li | G06F 3/04842 715/769 |
| 2014/0062976 | A1* | 3/2014 | Park | G06F 1/1652 345/204 |
| 2014/0078088 | A1* | 3/2014 | Seo | G06F 1/1652 345/173 |
| 2014/0347286 | A1* | 11/2014 | Prushinskiy | G06F 3/0487 345/173 |
| 2015/0227298 | A1* | 8/2015 | Kim | G06F 1/1652 715/799 |
| 2015/0301664 | A1* | 10/2015 | Tsai | H04N 21/4222 345/173 |
| 2016/0021484 | A1* | 1/2016 | Park | H04W 8/20 455/418 |
| 2016/0349962 | A1 | 12/2016 | Chen et al. | |
| 2018/0335880 | A1 | 11/2018 | Seol | |
| 2020/0175945 | A1 | 6/2020 | Chen et al. | |
| 2020/0320906 | A1* | 10/2020 | Knarr | G06F 1/1626 |
| 2020/0348822 | A1* | 11/2020 | Dascola | G06F 3/04817 |
| 2021/0389873 | A1 | 12/2021 | Chen et al. | |

FOREIGN PATENT DOCUMENTS

| | | | | |
|---|---|---|---|---|
| CN | 102890614 | A * | 1/2013 | |
| CN | 103513869 | A | 1/2014 | |
| CN | 103777871 | A | 5/2014 | |
| CN | 103914231 | A | 7/2014 | |
| CN | 104077033 | A | 10/2014 | |
| CN | 106055196 | A | 10/2016 | |
| CN | 106791646 | A | 5/2017 | |
| CN | 107426439 | A | 12/2017 | |
| CN | 109005289 | A | 12/2018 | |
| CN | 109917956 | A | 6/2019 | |
| CN | 109981839 | A | 7/2019 | |
| CN | 110222491 | A | 9/2019 | |
| EP | 2254313 | A1 * | 11/2010 | G06F 1/1616 |
| EP | 2709091 | A2 * | 3/2014 | G06F 1/1626 |
| EP | 2282258 | B1 * | 9/2019 | G06F 3/0482 |
| EP | 3896946 | A1 | 10/2021 | |
| ES | 1078889 | U * | 3/2013 | A45C 11/00 |
| IN | 107765835 | A | 3/2018 | |
| JP | 2002251163 | A * | 9/2002 | G09G 3/34 |
| JP | 2012095069 | A * | 5/2012 | G06F 21/36 |
| KR | 20100005438 | A * | 1/2010 | |
| KR | 20120069362 | A * | 6/2012 | |
| KR | 2013085528 | A * | 7/2013 | G06F 1/1652 |
| KR | 20150074664 | A * | 7/2015 | |
| KR | 20150094484 | A * | 8/2015 | |
| KR | 20160033507 | A * | 3/2016 | |
| KR | 2017001219 | A * | 1/2017 | G06F 21/31 |
| KR | 101899812 | B1 * | 9/2018 | |
| KR | 20220079189 | A * | 6/2022 | |
| WO | WO-2005077096 | A2 * | 8/2005 | G09F 9/30 |
| WO | WO-2012108668 | A2 * | 2/2012 | G06F 1/1616 |
| WO | WO-2012026395 | A1 * | 3/2012 | G06F 21/36 |
| WO | WO-2013184384 | A2 * | 12/2013 | G06F 17/30241 |
| WO | 2018191900 | A1 | 10/2018 | |

* cited by examiner

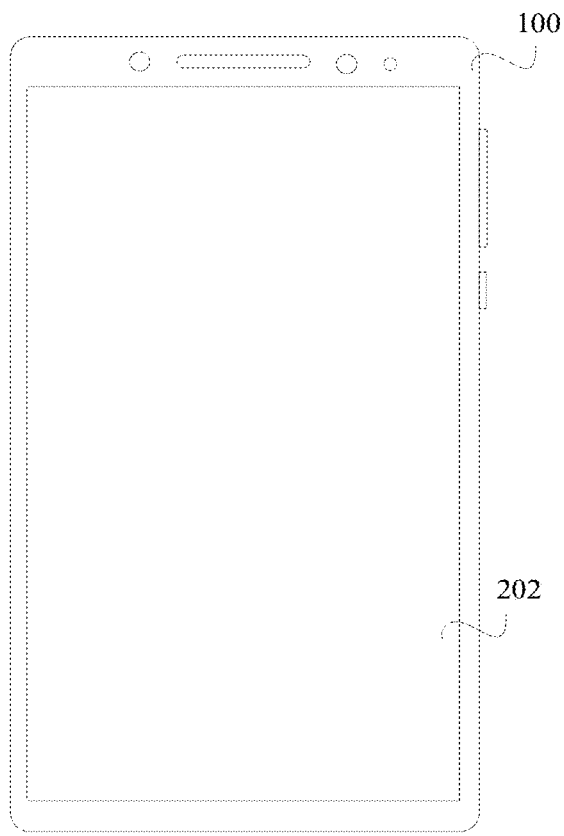
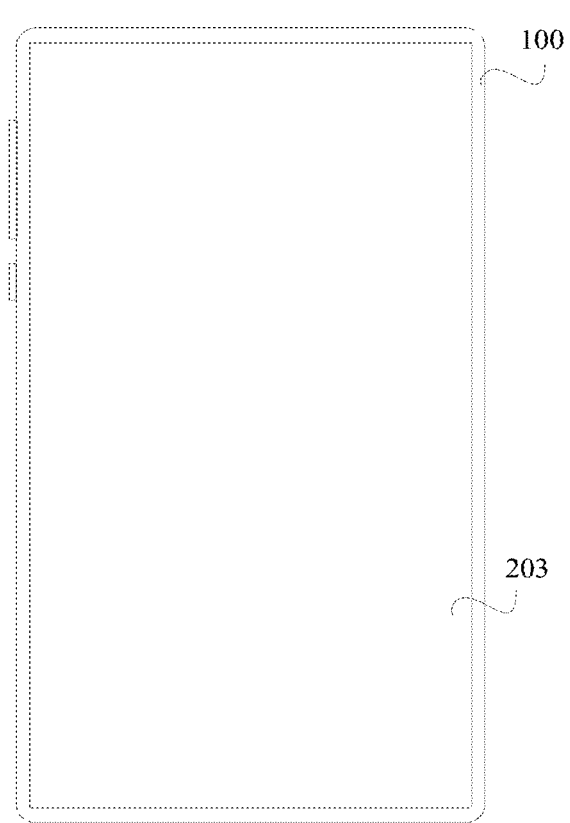
FIG. 2C
FIG. 2D

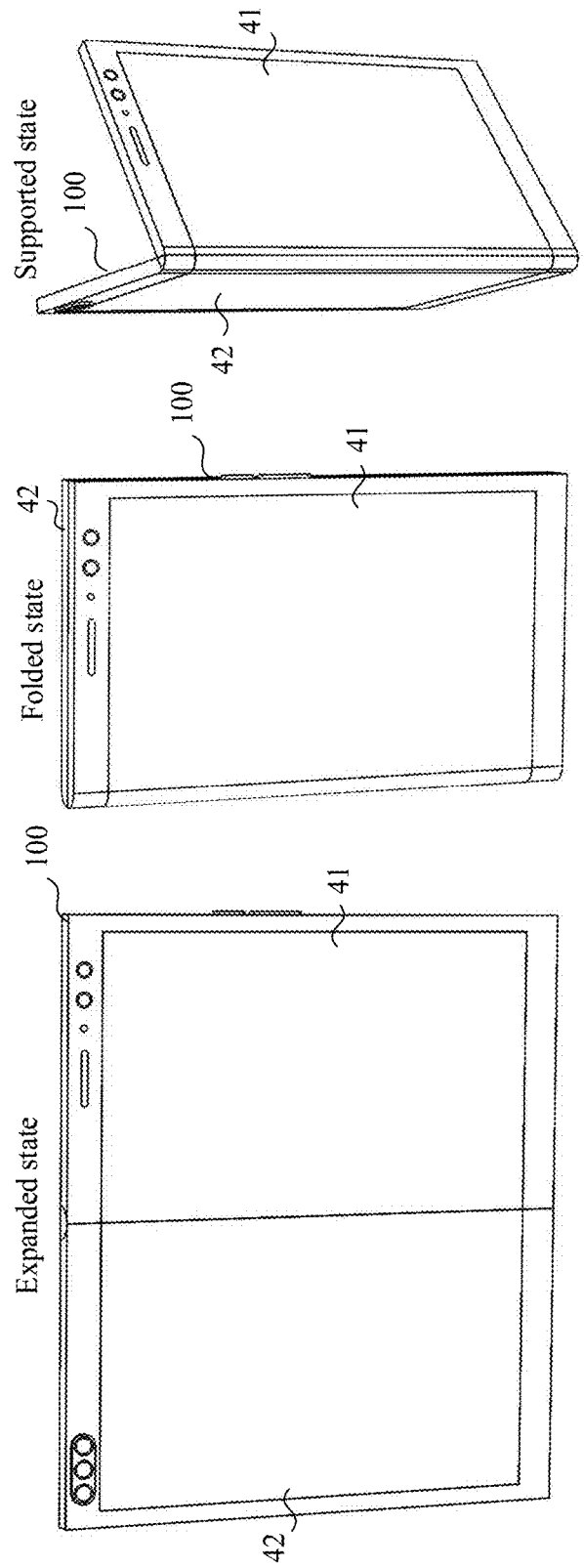

ELECTRONIC DEVICE CONTROL METHOD AND ELECTRONIC DEVICE

CROSS-REFERENCE TO RELATED APPLICATIONS

This disclosure is a continuation of International Patent Application No. PCT/CN2020/117318 filed on Sep. 24, 2020, which claims priority to Chinese Patent Application No. 201910939210.X filed on Sep. 30, 2019. The disclosures of the aforementioned applications are hereby incorporated by reference in their entireties.

TECHNICAL FIELD

This disclosure relates to the field of terminal technologies, and in particular, to an electronic device control method and an electronic device.

BACKGROUND

With development of terminal technologies, a user may install various applications (APPs) on a terminal based on a preference of the user. Some applications such as an application social, an application e-commerce, and an application e-bank require privacy protection. Some applications, for example, tool applications such as camera, flashlight, and calculator, do not require privacy protection.

The terminal supports a lock function to ensure user information security. A mobile phone is used as an example. When the user does not use the mobile phone, the user may lock a screen of the mobile phone to prevent information leakage or an accidental touch on the screen. In this way, when the user needs to use an application in the mobile phone, the user needs to first unlock the screen of the mobile phone, and then open the application. An opening process of a calculator is used as an example. The user needs to light up a screen by tapping a power button or the like, so that the mobile phone displays a lock screen interface. Then, the user enters an unlock password or an unlock pattern in the lock screen interface to unlock the screen. After the screen is unlocked, the user finds an icon corresponding to the calculator on the home screen of the mobile phone and taps the icon to open the calculator.

The user expects to be able to open, in the shortest time, an application that does not require privacy protection. However, in the foregoing application opening scenario, an operation performed by the user when the user uses the application corresponding to non-privacy protection is complex, and poor user experience is the result.

SUMMARY

This disclosure provides an electronic device control method and an electronic device, to reduce a quantity of operation steps performed by a user when the user opens an application corresponding to non-privacy protection, and improve user experience.

According to a first aspect, this disclosure provides an electronic device control method. An electronic device includes a first display screen and a second display screen. The method includes receiving a screen-on instruction entered by a user on the electronic device, when the first display screen of the electronic device is in a target orientation, displaying an icon of at least one first application on the first display screen, where the first application is an application that can be opened when the electronic device is in a locked state, and when the second display screen of the electronic device is in a target orientation, displaying a lock screen interface on the second display screen.

In a possible implementation, a gravity sensor is disposed on the electronic device. After receiving a screen-on instruction entered by a user on the electronic device, the method further includes, based on a signal collected by the gravity sensor, determining that the first display screen is in the target orientation, or determining that the second display screen is in the target orientation.

In this way, when the user needs to open an application corresponding to non-unlocked opening, the first display screen of the mobile phone directly faces upward or faces the user, so that the user can open a corresponding application by tapping an icon on the first display screen. Because the user does not need to first unlock the mobile phone, and the user does not need to invoke a shortcut opening interface through a preset slide operation in a locked state, a quantity of operation steps performed by the user when the user opens the application corresponding to non-unlocked opening is reduced, and better use experience is provided for the user. In addition, in this embodiment, the application corresponding to non-unlocked opening and the lock screen interface are separately displayed. When an icon of the application corresponding to non-unlocked opening is displayed on the first display screen, the lock screen interface is not opened, and a lock screen function is not affected, to ensure security of another application.

In a possible implementation, displaying an icon of at least one first application on the first display screen includes displaying the icon of the at least one first application on the first display screen in a lit state.

In a possible implementation, displaying an icon of at least one first application on the first display screen includes displaying the icon of the at least one first application on the first display screen in a screen-off state.

In this implementation, power consumption can be further reduced in a screen-off display state.

In a possible implementation, after displaying an icon of at least one first application on the first display screen, the method further includes receiving an opening instruction entered by the user on an icon of a target application, where the target application is any application in the at least one first application, and displaying a page of the target application on the first display screen according to the opening instruction.

In a possible implementation, the first display screen and the second display screen are different display regions of a flexible display in an unexpanded state. After receiving a screen-on instruction entered by a user on the electronic device, the method further includes detecting an included angle between the first display screen and the second display screen, and determining, based on the included angle between the first display screen and the second display screen, that the flexible display is in an expanded state or an unexpanded state.

In a possible implementation, the method further includes receiving a display screen setting instruction entered by the user on the electronic device, where the display screen setting instruction is used to indicate display usage of display screens of the electronic device, and display usage includes displaying the lock screen interface and displaying the icon of the at least one first application, and determining the first display screen and the second display screen from the display screens of the electronic device according to the display screen setting instruction.

In this implementation, the user may self-define, based on a use habit, a specific screen used to display a first application and a specific screen used to display an unlock interface, to improve flexibility.

In a possible implementation, the method further includes receiving an application setting instruction entered by the user on the electronic device, where the application setting instruction is used to indicate opening attributes corresponding to applications of the electronic device, and the opening attributes include unlocked opening and non-unlocked opening, and determining the at least one first application from the applications of the electronic device according to the program setting instruction.

In this implementation, the user may independently set a specific application as a first application based on a requirement, to improve flexibility.

According to a second aspect, this disclosure provides an electronic device control method. An electronic device includes a display screen. The method includes determining, when the display screen of the electronic device is in a screen-off state, whether a screen-off display condition is met, and when the screen-off display condition is met, displaying an icon of at least one first application on the display screen in the screen-off state, where the first application is an application that can be opened when the electronic device is in a locked state.

In this way, a user can see, on the display screen in the screen-off state, an icon of an application corresponding to non-unlocked opening, so that the user can open the corresponding application by operating the icon. Because the user does not need to first unlock the mobile phone, and the user does not need to invoke a shortcut opening interface through a preset slide operation in a locked state, a quantity of operation steps performed by the user when the user opens the application corresponding to non-unlocked opening is reduced, and better use experience is provided for the user.

In a possible implementation, after displaying an icon of at least one first application on the display screen in the screen-off state, the method further includes receiving an opening instruction entered by a user on an icon of a target application, where the target application is any application in the at least one first application, and displaying a page of the target application on the display screen according to the opening instruction.

In this implementation, the user may open a first application on the display screen in the screen-off state, to improve opening efficiency of the application.

In a possible implementation, determining, when the display screen of the electronic device is in a screen-off state, whether a screen-off display condition is met includes determining, by using detection data reported by at least one of an infrared sensor, a camera, an optical proximity sensor, or a touch panel of the display screen, whether the screen-off display condition is met.

In a possible implementation, determining, by using detection data reported by at least one of an infrared sensor, a camera, an optical proximity sensor, or a touch panel of the display screen, whether the screen-off display condition is met includes, if the infrared sensor of the electronic device captures an infrared signal radiated by a human body, determining that the screen-off display condition is met, if the camera of the electronic device captures face information, determining that the screen-off display condition is met, if the optical proximity sensor of the electronic device detects that ambient light intensity falls within a preset interval, determining that the screen-off display condition is met, or if locations and a quantity of touch points on the display screen match a preset grip posture, determining that the screen-off display condition is met.

In this implementation, screen-off display is performed only when it is detected that the screen-off display condition is met, so that power consumption can be further reduced.

In a possible implementation, receiving an opening instruction entered by the user on an icon of a target application includes detecting a preset operation entered by the user on the icon of the target application, where the preset operation is any one of the following: a double-tap operation, a continuous-tap operation, a knuckle-tap operation, and a slide operation.

In this implementation, the user can open the application by entering the foregoing operation on the screen in the screen-off state. Therefore, opening efficiency of the application is improved, and false opening caused by an accidental touch of the user is also avoided.

In a possible implementation, the method further includes receiving an application setting instruction entered by the user on the electronic device, where the application setting instruction is used to indicate opening attributes corresponding to applications of the electronic device, and the opening attributes include unlocked opening and non-unlocked opening, and determining the at least one first application from the applications of the electronic device according to the program setting instruction.

In this implementation, the user may independently set a specific application as a first application based on a requirement, to improve flexibility.

According to a third aspect, this disclosure provides an electronic device control apparatus. An electronic device includes a first display screen and a second display screen. The apparatus includes a receiving module configured to receive a screen-on instruction entered by a user on the electronic device, a processing module configured to determine orientations of the first display screen and the second display screen of the electronic device, and a display module configured to when the first display screen of the electronic device is in a target orientation, display an icon of at least one first application on the first display screen, where the first application is an application that can be opened when the electronic device is in a locked state, and when the second display screen of the electronic device is in a target orientation, display a lock screen interface on the second display screen.

In a possible implementation, a gravity sensor is disposed on the electronic device. The processing module is further configured to determine, based on a signal collected by the gravity sensor, that the first display screen is in the target orientation or that the second display screen is in the target orientation.

In a possible implementation, the display module is further configured to display the icon of the at least one first application on the first display screen in a lit state.

In a possible implementation, the display module is further configured to display the icon of the at least one first application on the first display screen in a screen-off state.

In a possible implementation, the receiving module is further configured to receive an opening instruction entered by the user on an icon of a target application, where the target application is any application in the at least one first application, and the display module is further configured to display a page of the target application on the first display screen according to the opening instruction.

In a possible implementation, the first display screen and the second display screen are different display regions of a flexible display in an unexpanded state. The processing module is further configured to detect an included angle between the first display screen and the second display screen, and determine, based on the included angle between the first display screen and the second display screen, that the flexible display is in an expanded state or an unexpanded state.

In a possible implementation, the receiving module is further configured to receive a display screen setting instruction entered by the user on the electronic device, where the display screen setting instruction is used to indicate display usage of display screens of the electronic device, and the display usage includes displaying the lock screen interface and displaying the icon of the at least one first application, and the processing module is further configured to determine the first display screen and the second display screen from the display screens of the electronic device according to the display screen setting instruction.

In a possible implementation, the receiving module is further configured to receive an application setting instruction entered by the user on the electronic device, where the application setting instruction is used to indicate opening attributes corresponding to applications of the electronic device, and the opening attributes include unlocked opening and non-unlocked opening, and the processing module is further configured to determine the at least one first application from the applications of the electronic device according to the program setting instruction.

According to a fourth aspect, this disclosure provides an electronic device control apparatus. An electronic device includes a display screen. The apparatus includes a processing module configured to determine, when the display screen of the electronic device is in a screen-off state, whether a screen-off display condition is met, and a display module configured to, when the screen-off display condition is met, display an icon of at least one first application on the display screen in the screen-off state, where the first application is an application that can be opened when the electronic device is in a locked state.

In a possible implementation, the apparatus further includes a receiving module configured to receive an opening instruction entered by a user on an icon of a target application, where the target application is any application in the at least one first application, and the display module is further configured to display a page of the target application on the display screen according to the opening instruction.

In a possible implementation, the processing module is further configured to determine, by using detection data reported by at least one of an infrared sensor, a camera, an optical proximity sensor, or a touch panel of the display screen, whether the screen-off display condition is met.

In a possible implementation, the processing module is further configured to, if the infrared sensor of the electronic device captures an infrared signal radiated by a human body, determine that the screen-off display condition is met, if the camera of the electronic device captures face information, determine that the screen-off display condition is met, if the optical proximity sensor of the electronic device detects that ambient light intensity falls within a preset interval, determine that the screen-off display condition is met, or if locations and a quantity of touch points on the display screen match a preset grip posture, determine that the screen-off display condition is met.

In a possible implementation, the receiving module is further configured to detect a preset operation entered by the user on the icon of the target application, where the preset operation is any one of the following: a double-tap operation, a continuous-tap operation, a knuckle-tap operation, and a slide operation.

In a possible implementation, the receiving module is further configured to receive an application setting instruction entered by the user on the electronic device, where the application setting instruction is used to indicate opening attributes corresponding to applications of the electronic device, and the opening attributes include unlocked opening and non-unlocked opening, and the processing module is further configured to determine the at least one first application from the applications of the electronic device according to the program setting instruction.

According to a fifth aspect, this disclosure provides an electronic device, including a first display screen, a second display screen, one or more processors, one or more memories, one or more sensors, and one or more computer programs. The one or more computer programs are stored in the one or more memories, the one or more computer programs include instructions, and when the instructions are executed by the electronic device, the electronic device is enabled to perform the method according to any one of the first aspect or the possible implementations.

According to a sixth aspect, this disclosure provides an electronic device, including a display screen, one or more processors, one or more memories, one or more sensors, and one or more computer programs. The one or more computer programs are stored in the one or more memories, the one or more computer programs include instructions, and when the instructions are executed by the electronic device, the electronic device is enabled to perform the method according to any one of the second aspect or the possible implementations.

According to a seventh aspect, this disclosure provides a computer-readable storage medium. The computer-readable storage medium stores instructions, and when the instructions are run on an electronic device, the electronic device is enabled to perform the method according to any one of the first aspect or the possible implementations.

According to an eighth aspect, this disclosure provides a computer-readable storage medium. The computer-readable storage medium stores instructions, and when the instructions are run on an electronic device, the electronic device is enabled to perform the method according to any one of the second aspect or the possible implementations.

According to a ninth aspect, this disclosure provides a computer program product including instructions. When the computer program product runs on an electronic device, the electronic device is enabled to perform the method according to any one of the first aspect or the possible implementations.

According to a tenth aspect, this disclosure provides a computer program product including instructions. When the computer program product runs on an electronic device, the electronic device is enabled to perform the method according to any one of the second aspect or the possible implementations.

According to an eleventh aspect, this disclosure provides a chip. The chip includes a processor configured to perform the method according to any one of the first aspect or the possible implementations.

According to a twelfth aspect, this disclosure provides a chip. The chip includes a processor configured to perform the method according to any one of the second aspect or the possible implementations.

According to the electronic device control method and the electronic device provided in this disclosure, the screen-on instruction entered by the user on the electronic device is received, when the first display screen of the electronic device is in the target orientation, the icon of the at least one first application is displayed on the first display screen, where the first application is the application that can be opened when the electronic device is in the locked state, and when the second display screen of the electronic device is in the target orientation, the lock screen interface is displayed on the second display screen. In this way, when the user needs to open an application corresponding to non-unlocked opening, the first display screen of the mobile phone directly faces upward or faces the user, so that the user can open a corresponding application by tapping an icon on the first display screen. Because the user does not need to first unlock the mobile phone, and the user does not need to invoke a shortcut opening interface through a preset slide operation in a locked state, a quantity of operation steps performed by the user when the user opens the application corresponding to non-unlocked opening is reduced, and better use experience is provided for the user. In addition, in this disclosure, the application corresponding to non-unlocked opening and the lock screen interface are separately displayed. When an icon of the application corresponding to non-unlocked opening is displayed on the first display screen, the lock screen interface is not opened, and a lock screen function is not affected, to ensure security of another application.

BRIEF DESCRIPTION OF DRAWINGS

FIG. 2C and FIG. 2D are a schematic diagram of a structure of an electronic device according to an embodiment of this disclosure;

FIG. 5A, FIG. 5B, and FIG. 5C are a schematic diagram of a structure of an electronic device according to an embodiment of this disclosure;

DESCRIPTION OF EMBODIMENTS

The following describes implementations of embodiments in detail with reference to accompanying drawings.

An electronic device control method provided in the embodiments of this disclosure may be applied to an electronic device having a display screen, for example, a mobile phone, a tablet computer, a laptop computer, an ultra-mobile personal computer (UMPC), a handheld computer, a netbook, a personal digital assistant (PDA), a wearable device, or a virtual reality device. This is not limited in the embodiments of this disclosure.

Figure 1:
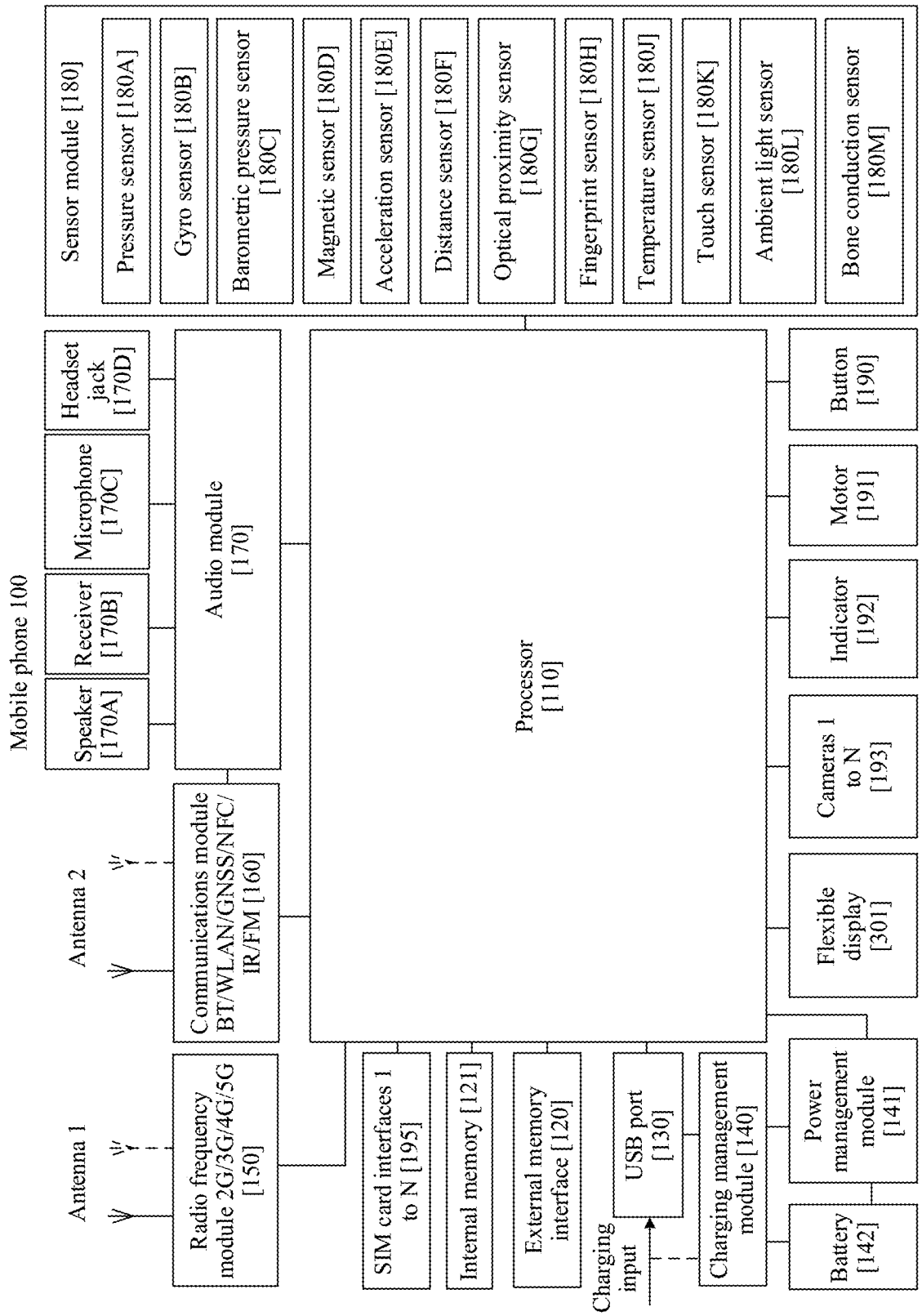
FIG. 1 is a schematic diagram of a structure of an electronic device according to an embodiment of this disclosure.

For example, a mobile phone 100 is the electronic device. FIG. 1 is a schematic diagram of a structure of the mobile phone.

The mobile phone 100 may include a processor 110, an external memory interface 120, an internal memory 121, a Universal Serial Bus (USB) port 130, a charging management module 140, a power management module 141, a battery 142, an antenna 1, an antenna 2, a radio frequency module 150, a communications module 160, an audio module 170, a speaker 170A, a receiver 170B, a microphone 170C, a headset jack 170D, a sensor module 180, a button 190, a motor 191, an indicator 192, a camera 193, a flexible display 301, a subscriber identification module (SIM) card interface 195, and the like.

It may be understood that the structure shown in this embodiment of this disclosure does not constitute a specific limitation on the mobile phone 100. In some other embodiments of this disclosure, the mobile phone 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the mobile phone 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, and reduces waiting time of the processor 110, so that system efficiency is improved.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a Mobile Industry Processor Interface (MIPI), a general-purpose input/output (GPIO) interface, a SIM interface, a USB port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the communications module 160 through the I2S interface, to implement a function of answering a call by using a BLUETOOTH headset.

The PCM interface may also be configured to perform audio communication, and sample, quantize, and encode an analog signal. In some embodiments, the audio module 170 may be coupled to the communications module 160 through a PCM bus interface. In some embodiments, the audio module 170 may also transmit an audio signal to the communications module 160 through the PCM interface, to implement a function of answering a call by using a BLUETOOTH headset. Both the I2S interface and the PCM interface may be configured to perform audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 and the communications module 160. For example, the processor 110 communicates with a BLUETOOTH module in the communications module 160 through the UART interface, to implement a BLUETOOTH function. In some embodiments, the audio module 170 may transmit an audio signal to the communications module 160 through the UART interface, to implement a function of playing music by using a BLUETOOTH headset.

The MIPI may be configured to connect the processor 110 to a peripheral component such as the flexible display 301 or the camera 193. The MIPI includes a camera serial interface (CSI), a display serial interface (DSI), and the like. In some embodiments, the processor 110 communicates with the camera 193 through the CSI, to implement a photographing function of the mobile phone 100. The processor 110 communicates with the flexible display 301 through the DSI, to implement a display function of the mobile phone 100.

The GPIO interface may be configured by using software. The GPIO interface may be configured as a control signal or a data signal. In some embodiments, the GPIO interface may be configured to connect the processor 110 to the camera 193, the flexible display 301, the communications module 160, the audio module 170, the sensor module 180, or the like. The GPIO interface may alternatively be configured as an I2C interface, an I2S interface, a UART interface, an MIPI, or the like.

The USB port 130 is a port that conforms to a USB standard specification, and may be further a mini USB port, a micro USB port, a USB Type-C port, or the like. The USB port 130 may be configured to connect to the charger to charge the mobile phone 100, or may be configured to transmit data between the mobile phone 100 and a peripheral device, or may be configured to connect to a headset to play audio by using the headset. Alternatively, the port may be configured to connect to another electronic device, for example, an augmented reality (AR) device.

It may be understood that an interface connection relationship between the modules shown in this embodiment of this disclosure is merely an example for description, and does not constitute a limitation on the structure of the mobile phone 100. In some other embodiments of this disclosure, the mobile phone 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the mobile phone 100. When charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the flexible display 301, the camera 193, the communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented by using the antenna 1, the antenna 2, the radio frequency module 150, the communications module 160, the modem processor, the baseband processor, and the like.

The antenna 1 and the antenna 2 are configured to transmit and receive electromagnetic wave signals. Each antenna in the mobile phone 100 may be configured to cover one or more communication bands. Different antennas may be further multiplexed to improve antenna utilization. For example, the antenna 1 may be multiplexed as a diversity antenna in a wireless local area network. In some other embodiments, the antenna may be used in combination with a tuning switch.

The radio frequency module 150 may provide a wireless communication solution that is applied to the mobile phone 100 and that includes second generation (2G)/third generation (3G)/fourth generation (4G)/fifth generation (5G). The radio frequency module 150 may include at least one filter, a switch, a power amplifier, a low noise amplifier (LNA), and the like. The radio frequency module 150 may receive an electromagnetic wave by using the antenna 1, perform processing such as filtering or amplification on the received electromagnetic wave, and transfer the electromagnetic wave to the modem processor for demodulation. The radio frequency module 150 may further amplify a signal modulated by the modem processor, and convert the signal into an electromagnetic wave for radiation by using the antenna 1. In some embodiments, at least some functional modules in the radio frequency module 150 may be disposed in the processor 110. In some embodiments, at least some functional modules in the radio frequency module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 170A, the receiver 170B, or the like), or displays an image or a video through the flexible display 301. In some embodiments, the modem processor may be an independent component. In some other embodiments, the modem processor may be independent of the processor 110, and is disposed in a same device as the radio frequency module 150 or another functional module.

The communications module 160 may provide a wireless communication solution that is applied to the mobile phone 100 and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like. The communications module 160 may be one or more devices integrating at least one communications processor module. The communications module 160 receives an electromagnetic wave by using the antenna 2, performs frequency modulation and filtering processing on an electromagnetic wave signal, and sends a processed signal to the processor 110. The communications module 160 may further receive a to-be-sent signal from the processor 110, perform frequency modulation and amplification on the signal, and convert the signal into an electromagnetic wave for radiation by using the antenna 2.

In some embodiments, the antenna 1 and the radio frequency module 150 of the mobile phone 100 are coupled, and the antenna 2 and the communications module 160 of the mobile phone 100 are coupled, so that the mobile phone 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The sensor module 180 may include one or more of a gyro, an acceleration sensor, a pressure sensor, a barometric pressure sensor, a magnetic sensor (for example, a Hall effect sensor), a distance sensor, an optical proximity sensor, a fingerprint sensor, a temperature sensor, a touch sensor, a pyroelectric infrared sensor, an ambient light sensor, or a bone conduction sensor. This is not limited in this embodiment of this disclosure.

The mobile phone 100 may implement a photographing function by using the ISP, the camera 193, the video codec, the GPU, the flexible display 301, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as red, green, and (RGB) or luma, blue projection, and red projection (YUV). In some embodiments, the mobile phone 100 may include one or N displays 193, where N is a positive integer greater than 1.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 can play or record videos in a plurality of encoding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the mobile phone 100, such as image recognition, facial recognition, voice recognition, and text understanding, can be implemented by using the NPU.

The external memory interface 120 may be configured to connect to an external storage card such as a micro Secure Digital (SD) card, to extend a storage capability of the mobile phone 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the mobile phone 100. The internal memory 121 may include a program storage area and a data storage area. The program storage area may store an operating system, an application required by at least one function (for example, a voice playing function or an image playing function), and the like. The data storage area may store data (for example, audio data or an address book) created during use of the mobile phone 100, and the like. In addition, the internal memory 121 may include a high-speed random-access memory (RAM), or may include a nonvolatile memory, for example, at least one magnetic disk storage device, a flash memory, or a Universal Flash Storage (UFS).

The mobile phone 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile phone 100 may listen to music or answer a hands-free call through the speaker 170A.

The receiver 170B, also referred to as an "earpiece", is configured to convert an audio electrical signal into a sound signal. When a call is answered or voice information is received by using the mobile phone 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset jack 170D is configured to connect to a wired headset. The headset jack 170D may be the USB port 130, or may be a 3.5 millimeter (mm) open mobile terminal platform (OMTP) standard interface or a Cellular Telecommunications Industry Association of the United States of America (USA) (CTIA) standard interface.

The button 190 includes a power button, a volume button, and the like. The button 190 may be a mechanical button, or may be a touch button. The mobile phone 100 may receive a key input, and generate a key signal input related to a user setting and function control of the mobile phone 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different regions of the flexible display 301. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the mobile phone 100. The mobile phone 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also applicable to an external storage card. The mobile phone 100 interacts with a network by using the SIM card, to implement functions such as calling and data communication. In some embodiments, the mobile phone 100 uses an eSIM, that is, an embedded SIM card. The eSIM card may be embedded in the mobile phone 100, and cannot be separated from the mobile phone 100.

The mobile phone 100 implements a display function by using the GPU, a display screen, the application processor, and the like. The GPU is a microprocessor for image processing, and is connected to the display screen and the application processor. The GPU is configured to perform mathematical and geometric calculation, and render an image. The processor 110 may include one or more GPUs that execute program instructions to generate or change display information.

The display screen may include a display and a touch panel. The display is configured to output display content to a user, and the touch panel is configured to receive a touch event entered by the user on the display screen. In this embodiment of this disclosure, the mobile phone 100 may have one or more display screens. The display screen of the electronic device may be a flexible display screen, or may be a non-flexible display screen.

Figure 2A:
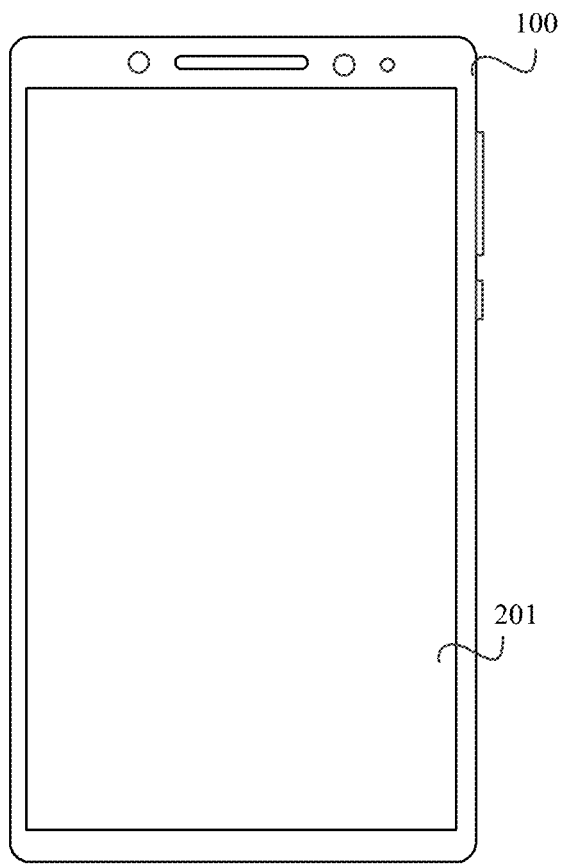
FIG. 2A and FIG. 2B are a schematic diagram of a structure of an electronic device according to an embodiment of this disclosure.
Figure 2B:
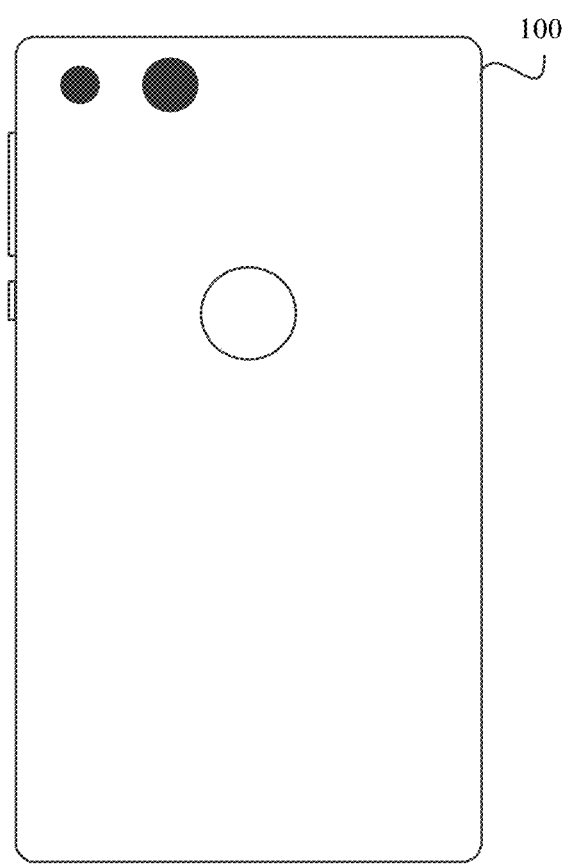

FIG. 2A and FIG. 2B to FIG. 3A, FIG. 3B, and FIG. 3C are schematic diagrams of several different mobile phones. As shown in FIG. 2A and FIG. 2B, the mobile phone 100 may be a single-screen mobile phone, that is, a display screen 201 is disposed on a front face of the mobile phone, where the display screen is a non-flexible display, and a back face of the mobile phone is a housing. FIG. 2A shows an example of a front face of the mobile phone. FIG. 2B shows an example of a back face of the mobile phone.

As shown in FIG. 2C and FIG. 2D, the mobile phone 100 may alternatively be a dual-screen mobile phone, that is, a display screen 202 is disposed on a front face of the mobile phone, and a display screen 203 is disposed on a back face of the mobile phone. Both the display screens may be non-flexible displays. FIG. 2C shows an example of a front face of the mobile phone. FIG. 2D shows an example of a back face of the mobile phone. One of the display screen 202 and the display screen 203 may be referred to as a primary screen of the mobile phone, and the other is referred to as a secondary screen of the mobile phone.

Figures 3A, 3B, 3C:
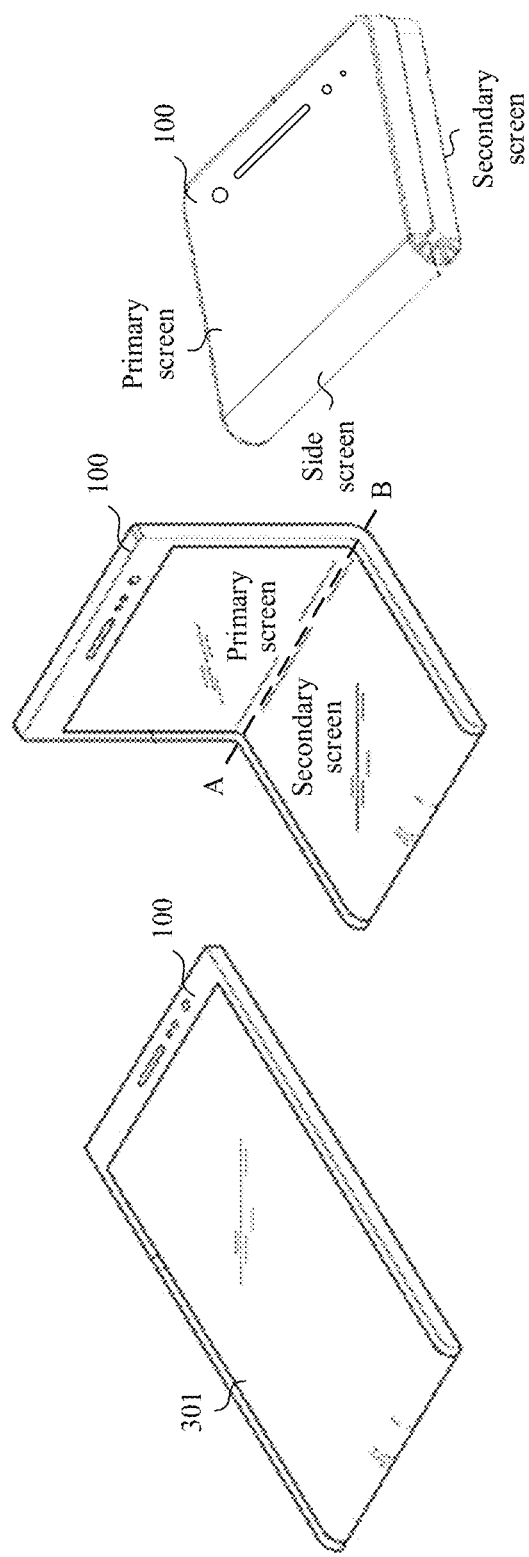
FIG. 3A, FIG. 3B, and FIG. 3C are a schematic diagram of a structure of an electronic device according to an embodiment of this disclosure.

As shown in FIG. 3A, FIG. 3B, and FIG. 3C, the mobile phone 100 may alternatively be a flexible display mobile phone, that is, a display screen of the mobile phone is a flexible display 301. As shown in FIG. 3A, the flexible display 301 may perform display as a complete display region in an expanded state. A user may fold the display along one or more folding lines in the flexible display. A location of the folding line may be preset, or may be randomly selected by the user on the flexible display.

As shown in FIG. 3B, after the user folds the flexible display along a folding line AB in the flexible display 301, the flexible display 301 may be divided into two display regions along the folding line AB, that is, a display region 1 and a display region 2. In this embodiment of this disclosure, the display region 1 and the display region 2 that are obtained after folding may be used as two independent display regions for displaying. For example, the display region 1 may be referred to as a primary screen of the mobile phone 100, and the display region 2 may be referred to as a secondary screen of the mobile phone 100. Display areas of the primary screen and the secondary screen may be the same or different.

It should be noted that after the user folds the flexible display 301 along the folding line AB, the primary screen and the secondary screen may be disposed opposite to each other, or the primary screen and the secondary screen may be away from each other. As shown in FIG. 3C, after the user folds the flexible display, the primary screen and the secondary screen are away from each other. In this case, both the primary screen and the secondary screen are exposed to an external environment. The user may perform display through the primary screen, or may perform display through the secondary screen.

In some embodiments, as shown in FIG. 3C, after the user folds the flexible display 301, a bent part (which may also be referred to as a side screen) of the screen may also be used as an independent display region. In this case, the flexible display 301 is divided into three independent display regions: the primary screen, the secondary screen, and the side screen.

Figure 4:
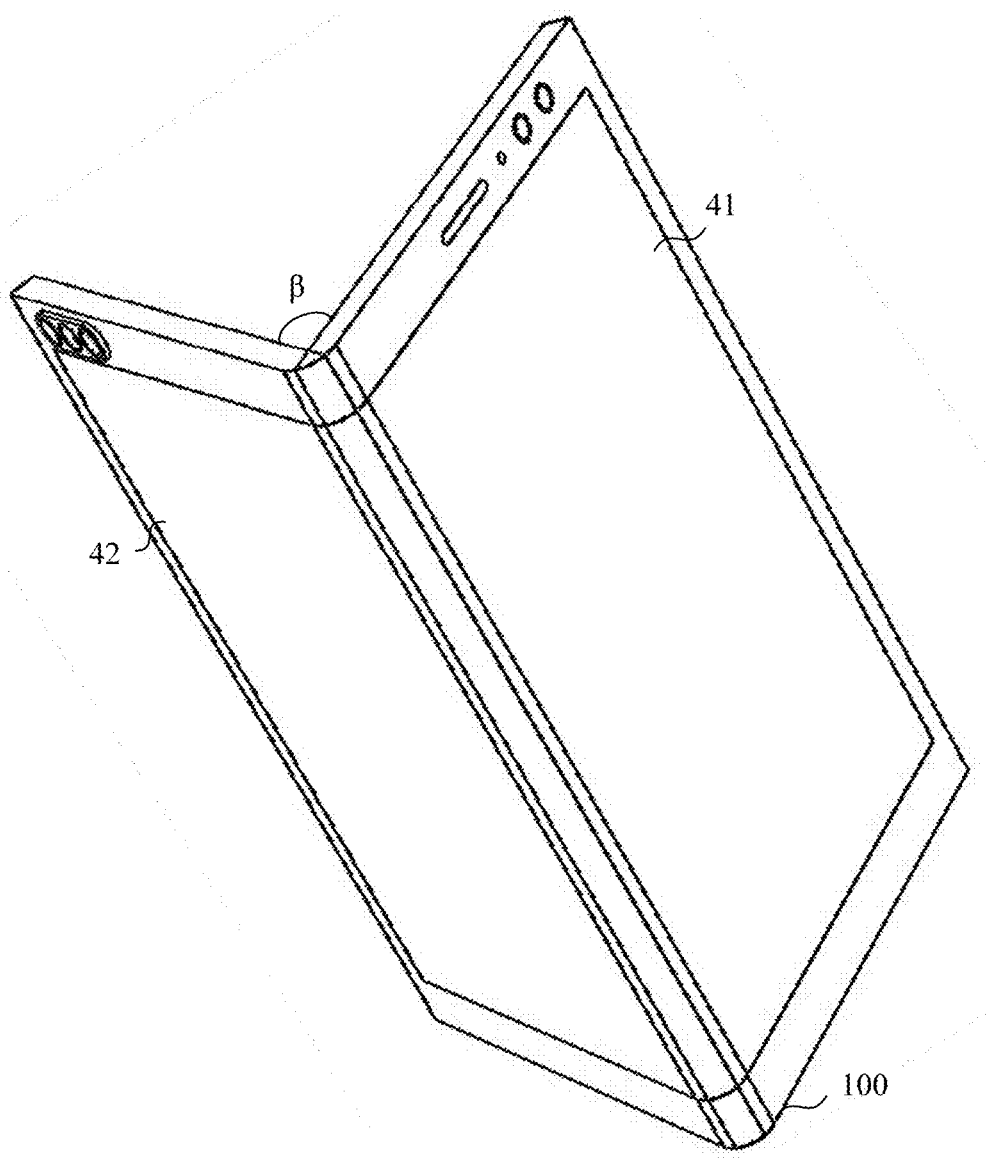
FIG. 4 is a schematic diagram of a structure of an electronic device according to an embodiment of this disclosure.

Refer to FIG. 4. After a user folds a flexible display, a specific included angle exists between a primary screen 41 and a secondary screen 42 that are obtained through division. The mobile phone 100 may calculate an included angle β between the primary screen and the secondary screen by using data detected by one or more sensors (for example, a gyro or an acceleration sensor). It may be understood that the angle β between the primary screen and the secondary screen falls within a closed interval formed by 0° to 180°.

For example, as shown in FIG. 5A, FIG. 5B, and FIG. 5C, when the included angle β between the primary screen 41 and the secondary screen 42 is greater than A first threshold (for example, 170 degrees))(°, the mobile phone 100 may determine that the flexible display 301 is in an expanded state. As shown in FIG. 5B, when the included angle β between the primary screen 41 and the secondary screen 42 is less than a second threshold (for example, 20°), the mobile phone 100 may determine that the flexible display is in a folded state. Alternatively, as shown in FIG. 5C, when the included angle β between the primary screen 41 and the secondary screen 42 falls within a preset interval (for example, between 40° and 60°), the mobile phone 100 may determine that the flexible display is in a supported state. In this embodiment of this disclosure, a physical form of the flexible display may be classified into an expanded state and an unexpanded state. Any physical form of the flexible display other than the foregoing expanded state may be referred to as the unexpanded state. For example, both the supported state and the folded state are unexpanded states.

A software system of the mobile phone 100 may use a layered architecture, an event-driven architecture, a microkernel architecture, a microservice architecture, or a cloud architecture. In this embodiment of this disclosure, an ANDROID system with a layered architecture is used as an example to describe the software structure of the mobile phone 100.

Figure 6A:
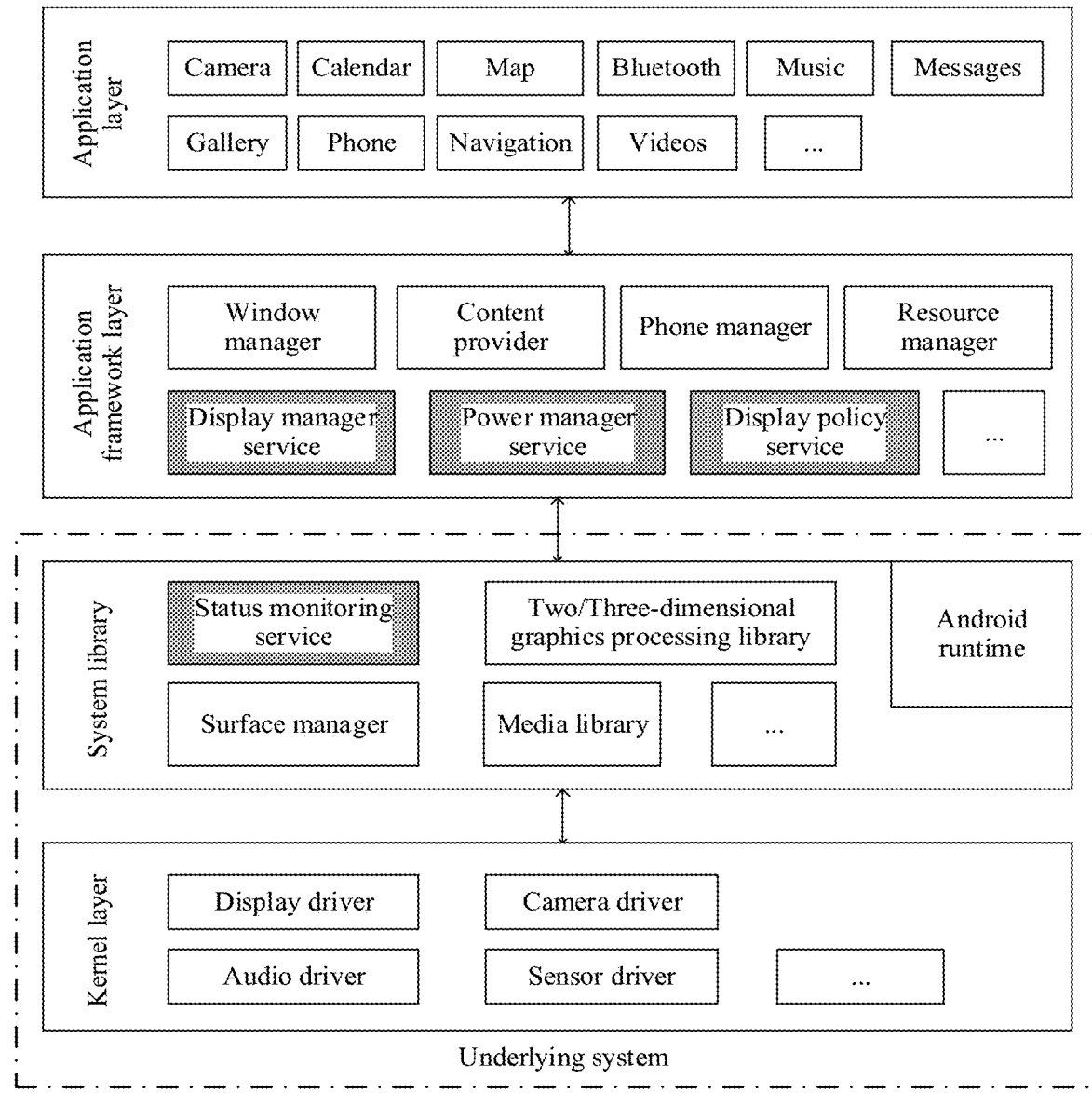
FIG. 6A is a schematic diagram of an architecture of an operating system of an electronic device according to an embodiment of this disclosure.

FIG. 6A is a block diagram of a software structure of the mobile phone 100 according to an embodiment of this disclosure.

In the layered architecture, software is divided into several layers, and each layer has a clear role and task. The layers communicate with each other through a software interface. In some embodiments, an ANDROID system is divided into four layers, that is, an application layer, an application framework layer, an ANDROID runtime and system library, and a kernel layer from top to bottom.

The application layer may include a series of application packages. As shown in FIG. 6A, applications such as camera, gallery, calendar, phone, map, navigation, BLUETOOTH, music, videos, and messages may be installed in the application layer.

The application framework layer provides an application programming interface (API) and a programming framework for an application at the application layer. The application framework layer includes some predefined functions. As shown in FIG. 6A, the application framework layer may include a display policy service, a power manager service (PMS), and a display manager service (DMS). Certainly, the application framework layer may further include an activity manager, a window manager, a content provider, a view system, a phone manager, a resource manager, a notification manager, and the like. This is not limited in this embodiment of this disclosure.

The display policy service may be configured to obtain a specific physical form of a current flexible display from an underlying display system. Further, the display policy service may determine, based on the specific physical form of the flexible display, a specific screen that currently needs to be woken up, that is, a specific display mode in which display is currently performed. For example, the display mode may include a primary screen display mode, a secondary screen display mode, a large screen display mode, and the like. In the primary screen display mode, the mobile phone may use the primary screen of the flexible display for display, and in this case, the secondary screen may be in a black screen state or a screen-off state. In the secondary screen display mode, the mobile phone may use the secondary screen of the flexible display for display, and in this case, the primary screen may be in a black screen state or a screen-off state. In the large-screen display mode, the mobile phone may perform display by using the entire flexible display as a complete display screen.

When the flexible display of the mobile phone is in a black screen (or screen-off) state, the mobile phone may receive a trigger operation used to wake up the display screen. For example, the trigger operation may be an operation of tapping a power button, a hand lifting operation, a double-tap operation, a floating touch operation, a fingerprint-based unlock operation, or an operation of plugging or unplugging a USB data line of the user. After receiving the trigger operation, the underlying system of the mobile phone may report a screen-on event to the power manager service. Further, the power manager service may obtain, from the display policy service, a specific screen that currently needs to be woken up. For example, when the flexible display is in an expanded state, the display policy service may determine that a screen that needs to be lit up at this time is a large screen formed by a primary screen and a secondary screen (that is, the large screen display mode). Further, the display policy service may notify the power manager service to light up the large screen. In this way, the power manager service may use the display manager service to wake up the large screen formed by the primary screen and the secondary screen, and perform display on the large screen.

Still as shown in FIG. 6A, the system library, the kernel layer, and the like below the application framework layer may be referred to as an underlying system. The underlying system includes an underlying display system configured to provide a display service. For example, the underlying display system includes a display driver at the kernel layer, a surface manager in the system library, and the like. In addition, the underlying system in this disclosure further includes a status monitoring service configured to identify a change of a physical form of the flexible display. The status monitoring service may be independently disposed in the underlying display system, or may be disposed in the system library and/or at the kernel layer.

For example, the status monitoring service may invoke a sensor service to enable a sensor in the mobile phone to perform detection. The status monitoring service may calculate a current included angle between the primary screen and the secondary screen based on detection data reported by each sensor. In this way, based on the included angle between the primary screen and the secondary screen, the status monitoring service may determine that the flexible display is in a physical form such as an expanded state, a folded state, or a supported state. In addition, the status monitoring service may report the determined physical form to the display policy service.

In some embodiments, when the status monitoring service determines that the mobile phone is currently in a folded state or a supported state, the status monitoring service may further enable a sensor such as a camera, an infrared sensor, an optical proximity sensor, or a touch panel (TP) to identify a specific orientation of the mobile phone. For example, the specific orientation of the mobile phone may include that the primary screen faces the user, the secondary screen faces the user, or the like. For example, when the mobile phone is in the folded state and the primary screen faces the user, the display policy service may determine the primary screen as a screen that needs to be lit up. When the mobile phone is in the folded state and the secondary screen faces the user, the display policy service may determine the secondary screen as a screen that needs to be lit up.

Figure 6B:
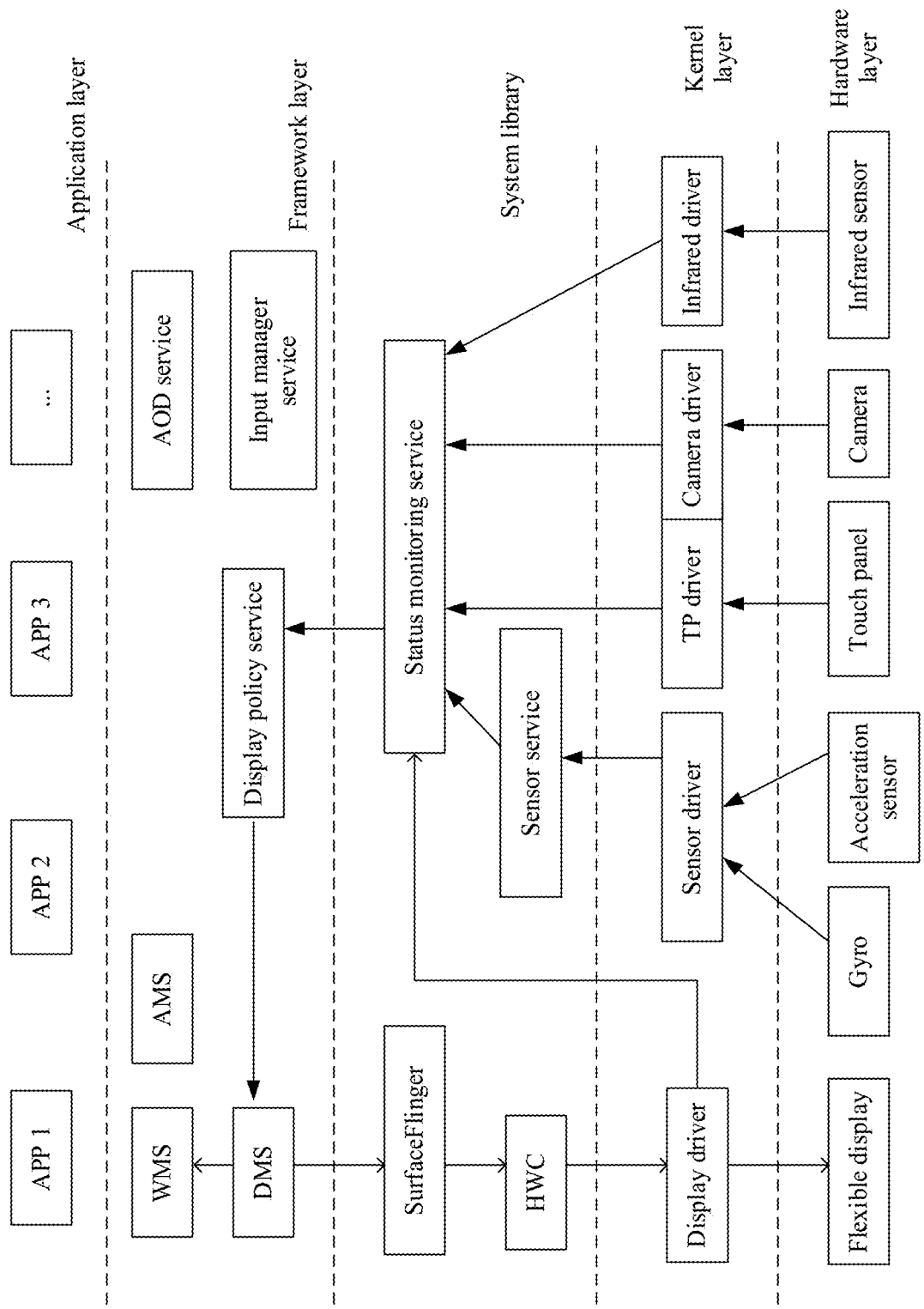
FIG. 6B is a schematic diagram of an architecture of an operating system of an electronic device according to an embodiment of this disclosure.

Similar to FIG. 6A, FIG. 6B is a schematic diagram of a data flow in an ANDROID operating system. For example, a gyro, an acceleration sensor, and the like at a hardware layer may report detected data to a sensor driver, and the sensor driver reports, by using a sensor service, the data detected by the gyro and the acceleration sensor to the status monitoring service. The status monitoring service may determine an included angle between the primary screen and the secondary screen based on the data detected by the gyro and the acceleration sensor, and further determine a physical form of the flexible display. In addition, the touch panel may also report the detected data to the status monitoring service by using a TP driver, the camera may report the detected data to the status monitoring service by using a camera driver, and the infrared sensor may report the detected data to the status monitoring service by using an infrared driver. The status monitoring service may determine a specific orientation of the mobile phone based on the data reported by the touch panel, the camera, or the infrared sensor. Further, the status monitoring service may report the determined specific orientation of the mobile phone and the determined physical form of the flexible display to the display policy service, and the display policy service determines a screen that currently needs to be lit up. The display policy service may notify the DMS of a determined display mode. For example, the display mode is a large screen display mode. The DMS may power on the entire flexible display by using SurfaceFlinger and the display driver, and the DMS may notify the window manager service (WMS) to create a corresponding window on the flexible display for display.

Figure 6C:
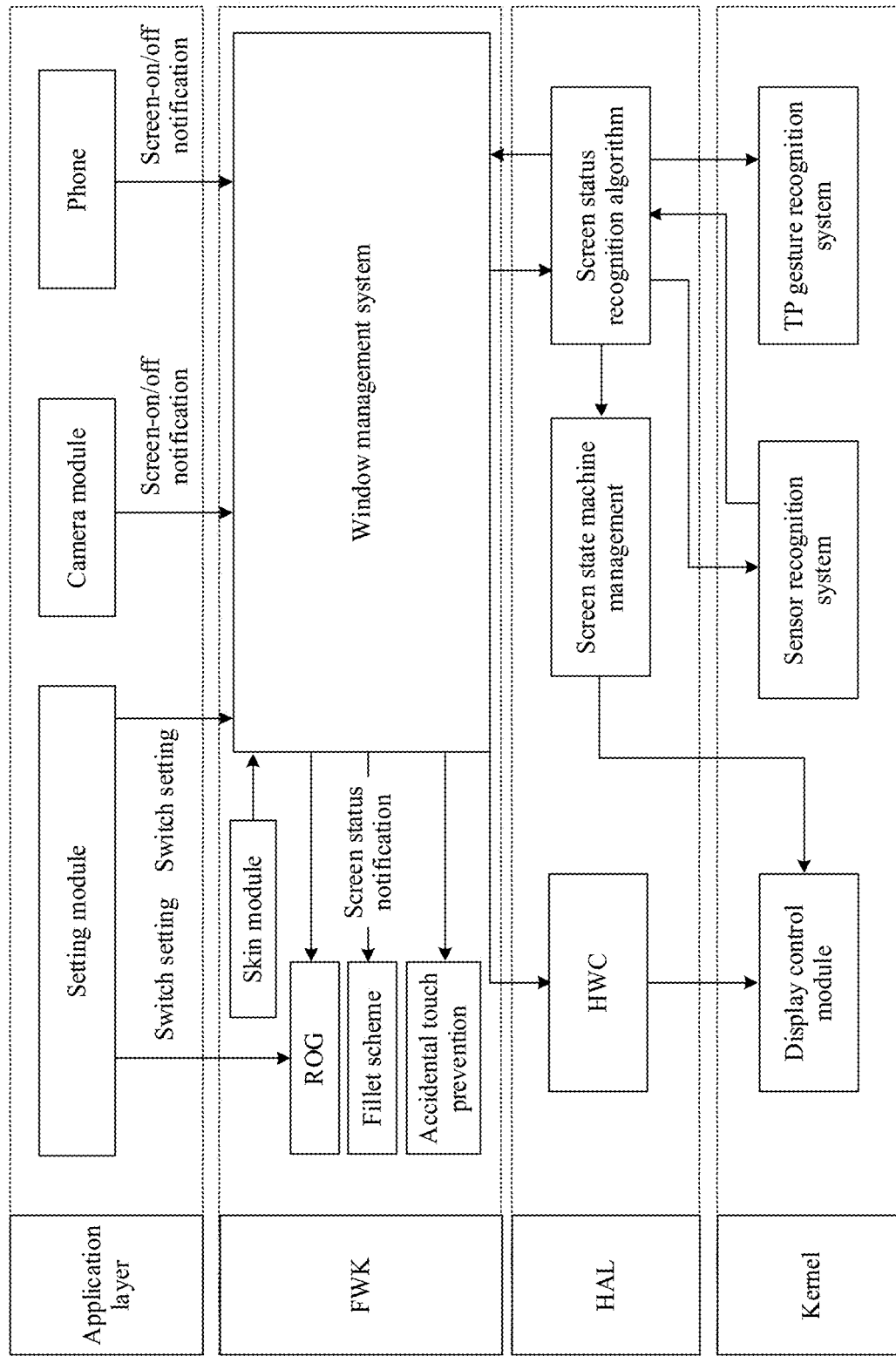
FIG. 6C is a schematic diagram of an architecture of an operating system of an electronic device according to an embodiment of this disclosure.

Similar to FIG. 6B, FIG. 6C is a schematic diagram of a module in an ANDROID operating system. For example, the display policy service, the DMS, and the WMS may be integrated into a window management system shown in FIG. 6C. The status monitoring service may be a screen status recognition algorithm module shown in FIG. 6C. Each sensor may be divided into a display control module, a sensor recognition system, and a TP gesture recognition system based on functions. For a specific interaction process between the modules, refer to related descriptions in FIG. 6B. Therefore, details are not described herein again.

The ANDROID runtime includes a core library and a virtual machine. The ANDROID runtime is responsible for scheduling and management of the ANDROID system.

The core library includes two parts: a function that needs to be invoked in JAVA language and a core library of ANDROID.

The application layer and the application framework layer are run on the virtual machine. The virtual machine executes JAVA files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL Embedded System (ES)), and a two-dimensional (2D) graphics engine (for example, SGL). The surface manager is configured to manage a display subsystem, and provide fusion of 2D and 3D layers for a plurality of applications. The media library supports playback and recording in a plurality of commonly used audio and video formats, static image files, and the like. The media library may support a plurality of audio and video encoding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG). The 3D graphics processing library is configured to implement 3D graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, a sensor driver, and the like. This is not limited in this embodiment of this disclosure.

The mobile phone usually supports a lock function, to ensure user information security. When the user does not use the mobile phone, the user may lock a screen of the mobile phone to prevent information leakage or an accidental touch on the screen. In this way, when the user needs to use an application in the mobile phone, the user needs to first unlock the screen of the mobile phone, and then open the application. An opening process of a calculator is used as an example. The user needs to light up a screen by tapping a power button or the like, so that the mobile phone displays a lock screen interface. Then, the user enters an unlock password or an unlock pattern in the lock screen interface to unlock the screen. After the screen is unlocked, the user finds an icon corresponding to the calculator on the home screen of the mobile phone and taps the icon to open the calculator.

The user expects to be able to open, in shortest time, an application that does not require privacy protection. However, in the foregoing application opening manner, an operation performed by the user when the user uses the application corresponding to non-privacy protection is complex, and poor use experience is brought to the user.

Figure 7A:
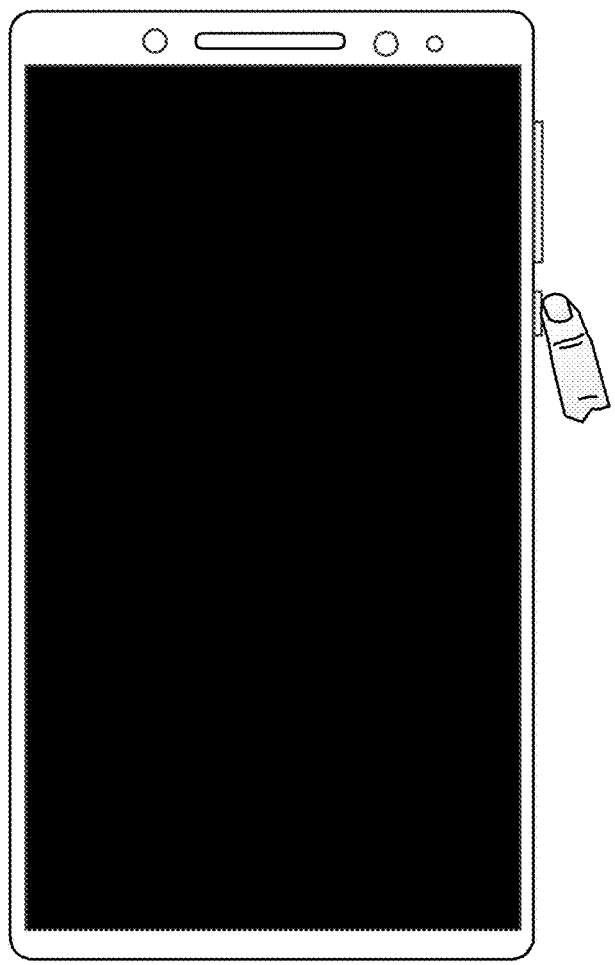
FIG. 7A, FIG. 7B, FIG. 7C, and FIG. 7D are a schematic diagram of a scenario of an electronic device control method according to an embodiment of this disclosure.
Figure 7B:
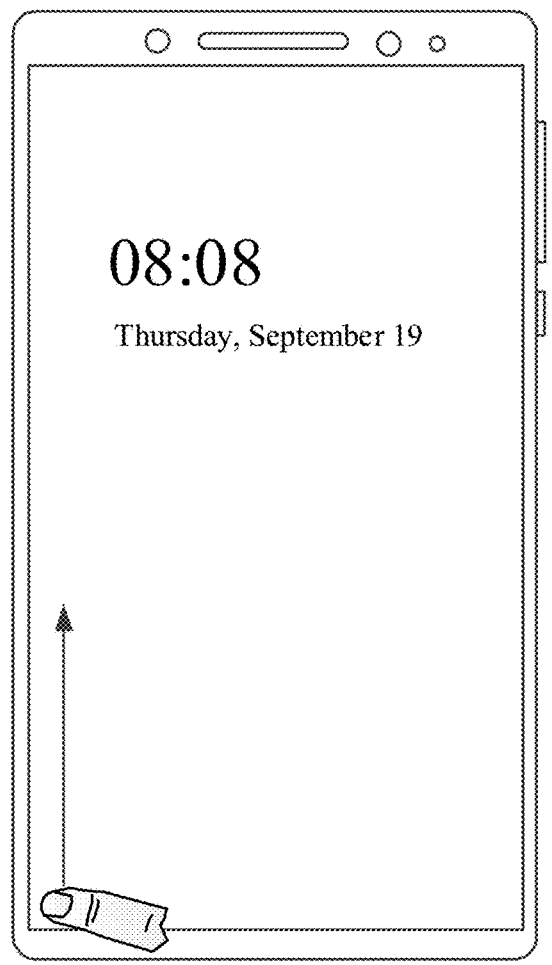
Figure 7C:
Figure 7D:

In a possible implementation, the mobile phone supports opening, in a locked state, an application that does not require privacy protection. FIG. 7A to FIG. 7D are a schematic diagram of opening an application in a locked state of a mobile phone according to an embodiment of this disclosure. For example, a calculator is opened. As shown in FIG. 7A, in a screen-off (or black screen) state of the mobile phone, the user lights up a screen by tapping a power button or the like, so that the mobile phone displays a lock screen interface shown in FIG. 7B. Then, the user slides, in the lock screen interface, a finger upward from a preset location at the bottom of the screen, so that the mobile phone displays a shortcut opening interface shown in FIG. 7C. The quick opening interface includes an icon of at least one application that does not require privacy protection. Further, as shown in FIG. 7D, the user may tap an icon in the shortcut opening interface, to open an application corresponding to the icon.

However, in the foregoing implementation, although the user does not need to unlock the mobile phone when opening the application that does not require privacy protection, the user needs to slide upward from the preset location at the bottom of the lock screen interface to invoke the shortcut opening interface. There is a strict requirement on a slide manner, that is, the user needs to slide upward from the preset location at the bottom of the lock screen. In addition, in the shortcut opening interface, icons of applications are displayed in a small region at the bottom in a centralized manner, and consequently an accidental touch easily occurs. In addition, for a mobile phone on which facial recognition is enabled, the user may automatically enter an unlock program through facial recognition before sliding to invoke a shortcut opening interface. As a result, use experience of the user is still poor.

To resolve at least one of the foregoing problems, an embodiment of this disclosure provides an electronic device control method, to improve user experience of using an application corresponding to non-privacy protection. It should be noted that, in this embodiment of this disclosure, an application that does not require privacy protection, an application corresponding to non-unlocked opening, a shortcut opening application, and a quick opening application are all applications that can be opened in a locked state of the mobile phone. In some scenarios, a same understanding may be made to these concepts.

The following describes, in detail with reference to the accompanying drawings by using an example in which a mobile phone is used as an electronic device, an electronic device control method provided in an embodiment of this disclosure.

Figure 8:
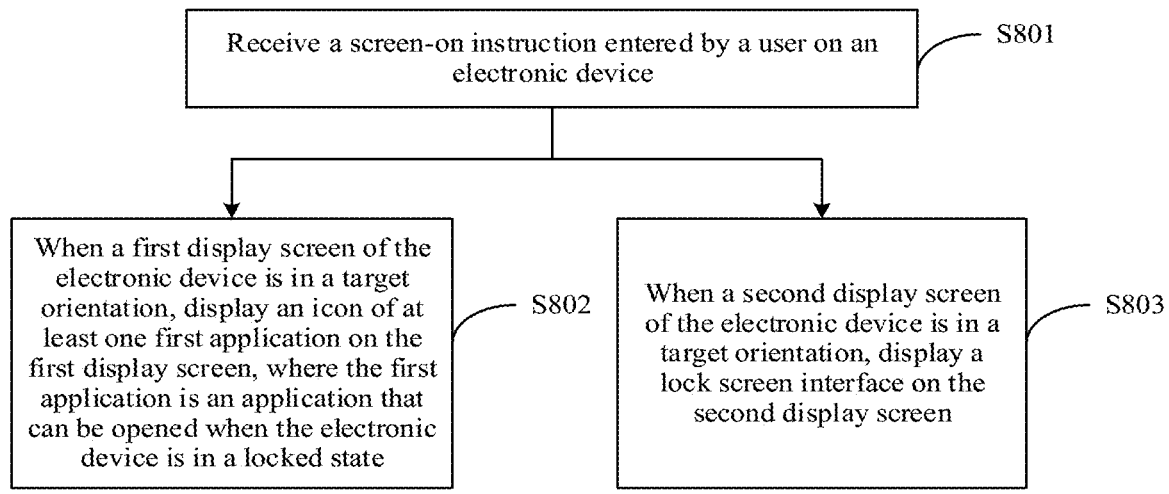
FIG. 8 is a schematic flowchart of an electronic device control method according to an embodiment of this disclosure.

FIG. 8 is a schematic flowchart of an electronic device control method according to an embodiment of this disclosure. The method in this embodiment is applicable to an electronic device including a first display screen and a second display screen. For example, the method in this embodiment may be applied to the dual-screen mobile phone shown in FIG. 2C and FIG. 2D. When the method is applied to the dual-screen mobile phone, the first display screen may be a primary screen of the dual-screen mobile phone, and the second display screen may be a secondary screen of the dual-screen mobile phone, or the first display screen may be a secondary screen of the dual-screen mobile phone, and the second display screen may be a primary screen of the dual-screen mobile phone. The method in this embodiment may be further applied to the flexible display mobile phone shown in FIG. 3A, FIG. 3B, and FIG. 3C. When being applied to the flexible display mobile phone, the method in this embodiment is particularly applicable to a scenario in which a flexible display is in an unexpanded state, that is, a scenario in which the flexible display is divided into a primary screen and a secondary screen. In this way, the first display screen may be the primary screen of the flexible display, and the second display screen may be the secondary screen of the flexible display, or the first display screen may be the secondary screen of the flexible display, and the second display screen may be the primary screen of the flexible display.

It should be noted that, regardless of the dual-screen mobile phone or the flexible display mobile phone, a manner of defining the primary screen and the secondary screen is not limited in this embodiment. For example, the primary screen and the secondary screen may be automatically defined based on a location of a camera. A display screen on a side on which the camera is located is used as the primary screen, and a display screen on a side on which there is no display screen is used as the secondary screen. Certainly, another definition manner may also be used. For example, the user may self-define, based on a preference or a use habit of the user, which display screen is used as the primary screen and which display screen is used as the secondary screen.

It should be understood that the embodiments of this disclosure are not limited to the dual-screen mobile phone shown in FIG. 2C and FIG. 2D and the flexible display mobile phone shown in FIG. 3A, FIG. 3B, and FIG. 3C, and may be further applied to another electronic device including a plurality of display screens. Details are not described in this embodiment.

As shown in FIG. 8, the method in this embodiment includes the following steps S801: Receive a screen-on instruction entered by a user on the electronic device.

S802: When the first display screen of the electronic device is in a target orientation, display an icon of at least one first application on the first display screen, where the first application is an application that can be opened when the electronic device is in a locked state.

S803: When the second display screen of the electronic device is in a target orientation, display a lock screen interface on the second display screen.

In this embodiment, based on a feature that the mobile phone includes a plurality of display screens, the first display screen is used to display the icon of the first application, and the second display screen is used to display the lock screen interface. The first application is an application that can be opened when the mobile phone is in a locked state (a screen of the mobile phone is in a locked state). The first application may also be referred to as an application corresponding to non-unlocked opening, an application that does not require privacy protection, or a shortcut opening application, for example, Notepad, camera, alarm clock, calculator, or flashlight.

It should be noted that the "application that can be opened in a locked state" in this embodiment means that when the mobile phone is in the locked state, if the mobile phone may be triggered, when the user taps an icon of an application in an interface, to display a page corresponding to the application, it indicates that the application is the application that can be opened in the locked state, or if the mobile phone is not triggered, when the user taps an icon of an application in an interface, to display a page corresponding to the application, it indicates that the application is not the application that can be opened in the locked state.

In this embodiment, when the display screen of the mobile phone is in a screen-off (or black screen) state, the mobile phone may receive the screen-on instruction entered by the user, to wake up the display screen of the mobile phone. Further, the mobile phone may display a corresponding interface based on specific orientations of the first display screen and the second display screen. When the first display screen is in the target orientation, the mobile phone displays the icon of the first application on the first display screen. When the second display screen is in the target orientation, the mobile phone displays the lock screen interface on the second display screen.

The screen-on instruction received by the mobile phone includes but is not limited to an operation of tapping a power button, a hand lifting operation of the user, a preset gesture action (for example, a single-tap operation, a double-tap operation, a slide operation, or a press operation) on the screen, and the like. The target orientation is facing the user or facing upward. For example, when the user taps a power butter of the mobile phone, if the first display screen faces upward/faces the user, the icon of the application corresponding to non-unlocked opening is displayed on the first display screen. If the second display screen faces upward/faces the user, the lock screen interface is displayed on the second display screen.

It should be noted that, that the display screen faces the user in this embodiment of this disclosure includes that the display screen faces the user at a substantially parallel angle between the display screen and a face of the user, or the display screen faces the user at a specific tilt angle. That the display screen faces upward in this embodiment of this disclosure includes that the display screen faces upward at a horizontal angle, or the display screen faces upward at a specific angle between the display screen and a horizontal plane.

Optionally, a gravity sensor is disposed on the mobile phone. After the screen-on instruction entered by the user on the mobile phone is received, based on a signal collected by the gravity sensor, it may be determined that the first display screen is in the target orientation, or may be determined that the second display screen is in the target orientation. The gravity sensor may also be referred to as a gravity inductor. A cantilever-type displacement device made of an elastic sensitive element and an energy storage spring made of an elastic sensitive element drive an electrical contact to complete conversion from gravity to an electrical signal. The gravity sensor in the mobile phone may sense a change of a posture of the mobile phone, and further determine orientations of the first display screen and the second display screen based on the posture of the mobile phone.

A dual-screen mobile phone is used as an example. A gravity sensor is disposed on a mainboard of the mobile phone, and a Cartesian coordinate system is set for the mainboard of the mobile phone. In the Cartesian coordinate system, an x-axis is parallel to a shorter side of the mobile phone, a y-axis is parallel to a longer side of the mobile phone, and a z-axis is perpendicular to a plane formed by the x-axis and the y-axis and points to the outside of the mainboard. An orientation of the z-axis of the mobile phone may be determined based on a signal collected by the gravity sensor. For example, if the signal collected by the gravity sensor indicates that the z-axis is vertically downward, it may be determined that an orientation of a primary screen is that the primary screen faces upward and an orientation of a secondary screen is that the secondary screen faces downward. If the signal collected by the gravity sensor indicates that the z-axis of the mobile phone is vertically upward, it may be determined that an orientation of a secondary screen is that the secondary screen faces upward and an orientation of a primary screen is that the primary screen faces downward.

For example, a first display screen and a second display screen of a flexible display mobile phone are different display regions of a flexible display in an unexpanded state. The method in this embodiment is applicable to a flexible display mobile phone in an unexpanded state. For example, in a folded state or a supported state, the secondary screen is used as the first display screen, and the primary screen is used as the second display screen. After receiving the screen-on instruction entered by the user, an included angle between the first display screen and the second display screen is first detected. For example, detection may be performed based on one or more signals collected by one or more sensors on the first display screen and/or the second display screen. Then, it is determined, based on the included angle between the first display screen and the second display screen, that the flexible display is in an expanded state or an unexpanded state. If it is determined that the flexible display is in the unexpanded state, orientations of the first display screen and the second display screen may be further determined by using a gravity sensor. It may be understood that, a principle of determining an orientation of the display screen of the flexible display mobile phone is similar to that of the dual-screen mobile phone. Details are not described herein again.

In a possible implementation, the method in this embodiment may further include receiving a display screen setting instruction entered by the user on the electronic device, where the display screen setting instruction is used to indicate display usage of display screens of the electronic device, and the display usage includes displaying the lock screen interface and displaying the icon of the at least one first application. For example, the user performs setting in a setting interface of the mobile phone, sets display usage of the primary screen to displaying an unlock interface, and sets display usage of the secondary screen to displaying the icon of the first application. Further, the mobile phone determines the first display screen and the second display screen from the display screens of the mobile phone according to the display screen setting instruction entered by the user. For example, the mobile phone determines the secondary screen as the first display screen, and determines the primary screen as the second display screen.

In this way, the user may set the display usage of the display screens based on a preference or a use habit of the user, to improve use experience of the user.

In a possible implementation, the method in this embodiment may further include receiving an application setting instruction entered by the user on the electronic device, where the application setting instruction is used to indicate opening attributes corresponding to applications of the electronic device, and the opening attributes include unlocked opening and non-unlocked opening. For example, the user may set an opening attribute for each application in a setting interface of the mobile phone, for example, set an opening attribute of an application such as E-bank, E-commerce, or Social as unlocked opening, and set an opening attribute of an application such as Notepad, flashlight, camera, or calculator as non-unlocked opening. Further, the mobile phone determines the at least one first application from the applications of the electronic device according to the program setting instruction entered by the user. For example, the mobile phone determines an application such as Notepad, flashlight, camera, or calculator as the first application.

In this way, the user may further independently set an application that can be opened in a locked state, so that the user can perform setting based on a preference and a use habit of the user, to improve use experience of the user.

The following describes the control method in this embodiment with reference to FIG. 9A and FIG. 9B and FIG. 9C, FIG. 9D, and FIG. 9E by using the dual-screen mobile phone shown in FIG. 2C and FIG. 2D as an example.

When the dual-screen mobile phone is in a screen-off (or black screen) state, the user may tap a power button to wake up a display screen of the mobile phone. The power button of the mobile phone may be a physical button or a virtual button. This is not limited in this embodiment. If the power button detects a tap operation of the user, the power button may report a screen-on event to a PMS at an application framework layer in a form of interruption. After receiving the screen-on event, the power manager service may invoke a sensor service to enable a gravity sensor for detection. The gravity sensor may report a collected signal to a status monitoring service in an underlying system. In this way, the status monitoring service may determine a posture of the mobile phone based on the signal collected by the gravity sensor, that is, determine orientations of the primary screen and the secondary screen. In this case, the status monitoring service may report the current orientations of the primary screen and the secondary screen of the mobile phone to a display policy service at the application framework layer. Further, the display policy service may determine, based on the orientations of the primary screen and the secondary screen, a screen that currently needs to be lit up.

Figure 9A:
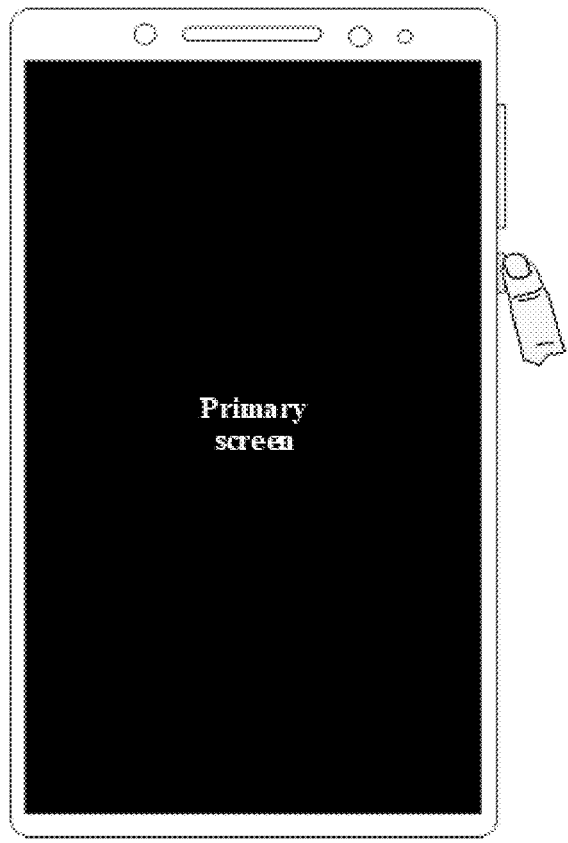
FIG. 9A and FIG. 9B are a schematic diagram of a scenario of an electronic device control method according to an embodiment of this disclosure.
Figure 9B:
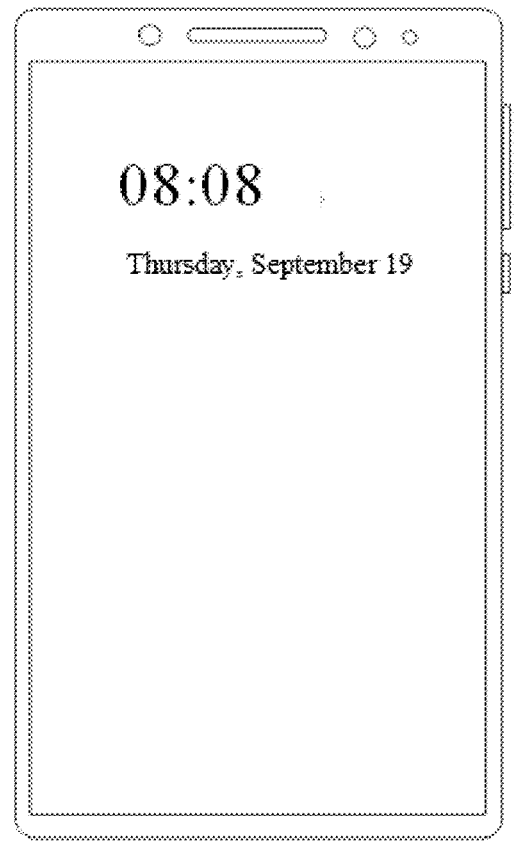

As shown in FIG. 9A, if the primary screen faces upward, the display policy service determines that the primary screen currently needs to be lit up. In this case, the display policy service may notify the power manager service that a current display mode is a primary screen display mode. In this way, as shown in FIG. 9B, the power manager service may invoke a corresponding interface to power on the primary screen, and display a lock screen interface on the primary screen by using a display manager service.

Figure 9E:
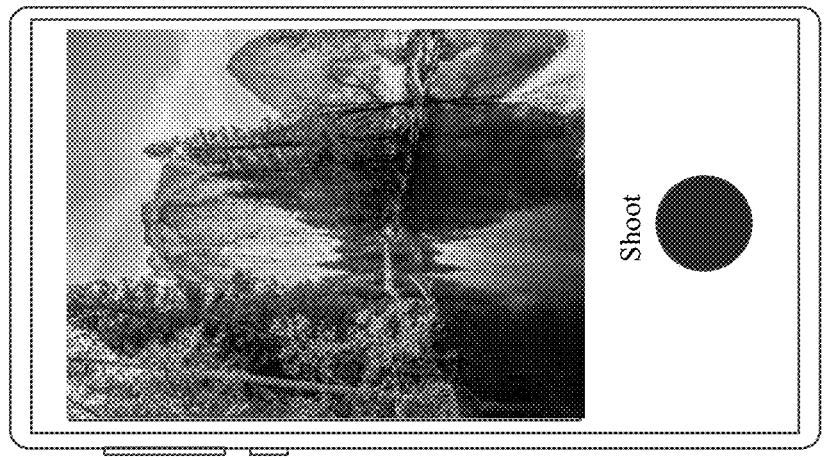
FIG. 9C, FIG. 9D, and FIG. 9E are a schematic diagram of a scenario of an electronic device control method according to an embodiment of this disclosure.
Figure 9D:
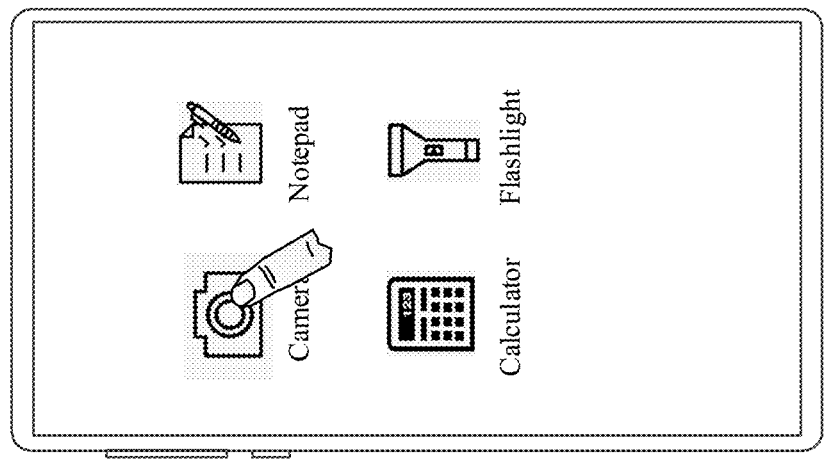
Figure 9C:
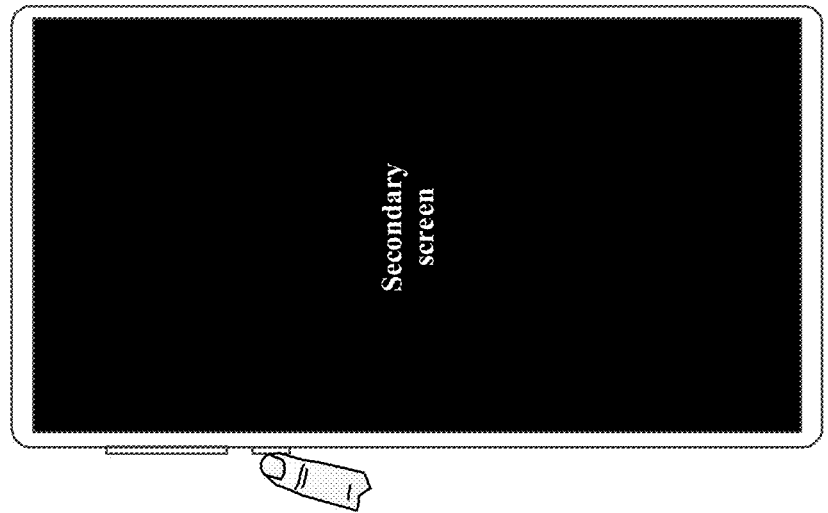

As described in FIG. 9C, if the secondary screen faces upward, the display policy service determines that the secondary screen currently needs to be lit up. In this case, the display policy service may notify the power manager service that a current display mode is a secondary screen display mode. In this way, as shown in FIG. 9D, the power manager service may invoke a corresponding interface to power on the secondary screen, and display, on the secondary screen by using a display manager service, an icon of an application (for example, Camera, Notepad, Flashlight, or Calculator) corresponding to non-unlocked opening. In this way, the user may tap, in FIG. 9D, an icon of an application that needs to be opened, for example, an icon of camera, to open the application camera in a locked state of the mobile phone, so that the mobile phone displays a camera shooting page shown in FIG. 9E.

In this way, if the user needs to unlock the mobile phone normally, the primary screen faces upward, and then screen-on is triggered. In this case, only the primary screen is lit up, but the secondary screen is not lit up. If the user does not need to unlock the mobile phone but only expects to quickly open an application corresponding to non-unlocked opening, the secondary screen faces upward, and then screen-on is triggered. In this case, only the secondary screen is lit up, but the primary screen is not lit up. The user directly taps an icon of an application displayed on the secondary screen, to open the application. It can be learned that, compared with the conventional technology, in this embodiment, a quantity of operation steps of the user is reduced, and use experience of the user is improved.

It should be noted that, in this embodiment, when the user taps the icon of the application corresponding to non-unlocked opening to enter the application, the mobile phone is still in the locked state. For example, as shown in FIG. 9E, on the camera shooting page, the user can only take a photo but cannot browse an album, so that security in a non-unlocked state is ensured.

Optionally, to reduce power consumption, in FIG. 9D, the mobile phone may alternatively display, in a screen-off display manner, the icon of the application corresponding to non-unlocked opening. To be specific, when the secondary screen faces upward, after the mobile phone detects that the user taps a power button, the secondary screen is not lit up, but one or more icons of one or more first applications are displayed on the secondary screen in a screen-off display manner. In this way, the user may double-tap an icon or the like to wake up the secondary screen and open a corresponding application in a screen-off state.

In some other embodiments, when the user taps the power button in a screen-off (or black screen) state, the status monitoring service may further invoke a sensor such as a camera, an infrared sensor, an optical proximity sensor, or a touch panel to identify specific orientations of the primary screen and the secondary screen of the mobile phone. It should be understood that the touch panel in this embodiment and a display may be integrated on the display screen, and the touch panel remains connected to the display. The touch panel may alternatively be independently disposed, and remains connected to the display in the display screen.

For example, a camera may be installed on each of the primary screen and the secondary screen. If the camera on the primary screen captures face information, but the camera on the secondary screen does not capture the face information, the status monitoring service may determine that the mobile phone is currently in a state in which the primary screen faces the user. For another example, an infrared sensor may be installed on each of the primary screen and the secondary screen. If the infrared sensor of the secondary screen captures an infrared signal radiated by a human body, but the infrared sensor on the primary screen does not capture the infrared signal radiated by the human body, the status monitoring service may determine that the mobile phone is currently in a state in which the secondary screen faces the user. For another example, the mobile phone may further report a current touch location of the user by using a touch panel, and may further determine, based on the touch location by using a preset grip algorithm, a grip posture in which the user currently grips the mobile phone. In this case, the status monitoring service may also determine a specific orientation of the mobile phone based on the grip posture of the mobile phone. For example, after detecting a touch event, the touch panel may report coordinates of a touch point to the status monitoring service. The status monitoring service determines the grip posture of the mobile phone by collecting statistics about locations and a quantity of touch points on the touch panel. For example, if it is detected that a quantity of touch points on the primary screen is greater than a preset value, it indicates that fingers and a palm of the user grips the primary screen, and a screen facing the user is the secondary screen. Correspondingly, if it is detected that a quantity of touch points on the secondary screen is greater than a preset value, it indicates that fingers and a palm of the user grip the secondary screen, and a screen facing the user is the primary screen.

It should be noted that the mobile phone may simultaneously use the foregoing one or more sensors to identify a specific orientation of the screen of the mobile phone. For example, when recognizing a grip posture of the user by using a grip algorithm, the mobile phone may open a camera to detect whether face information is captured. If it is detected that a quantity of touch points on the secondary screen is greater than a preset value, and the camera on the primary screen captures the face information, the mobile phone may determine a grip posture in which the primary screen faces the user.

In this case, the status monitoring service may report the current orientations of the primary screen and the secondary screen of the mobile phone to the display policy service at the application framework layer. Further, the display policy service may determine, based on the orientations of the primary screen and the secondary screen, a screen that currently needs to be lit up. If the secondary screen faces the user, the display policy service determines that the secondary screen currently needs to be lit up. If the primary screen faces the user, the display policy service determines that the primary screen currently needs to be lit up. Display control processes of the primary screen and the secondary screen are similar to those in FIG. 9A and FIG. 9B and FIG. 9C, FIG. 9D, and FIG. 9E. Details are not described herein again.

The following describes the control method in this embodiment with reference to FIG. 10A and FIG. 10B and FIG. 10C, FIG. 10D, and FIG. 10E by using the flexible display mobile phone shown in FIG. 3A, FIG. 3B, and FIG. 3C as an example.

When the flexible display mobile phone is in a screen-off (or black screen) state, the user may perform a hand lifting operation to wake up a display screen of the mobile phone. For example, in the screen-off (or black screen) state, the mobile phone may detect, in real time by using one or more sensors or the like, whether the user performs a hand lifting operation on the mobile phone. If the mobile phone detects that the user has performed the hand lifting operation, a corresponding sensor may report a screen-on event to a PMS. Similar to that in the foregoing control process of the dual-screen mobile phone, after receiving a screen-on event, the power manager service may identify a current physical status of a flexible display by using a status monitoring service, for example, determine, based on an included angle that is between the primary screen and the secondary screen and that is detected by one or more sensors, that the flexible display is in an expanded state or an unexpanded state. In addition, the status monitoring service may report the identified physical status of the flexible display to a display policy service.

When the flexible display is currently in the unexpanded state, the status detection server may further invoke a sensor such as a gravity sensor, a camera, an infrared sensor, an optical proximity sensor, or a touch panel to identify specific orientations of the primary screen and the secondary screen of the mobile phone. It should be understood that this part is similar to the foregoing control process of the dual-screen mobile phone. Details are not described herein again. In this case, the status monitoring service may report the current orientations of the primary screen and the secondary screen of the mobile phone to the display policy service at the application framework layer. Further, the display policy service may determine, based on the orientations of the primary screen and the secondary screen, a screen that currently needs to be lit up.

Figure 10A:
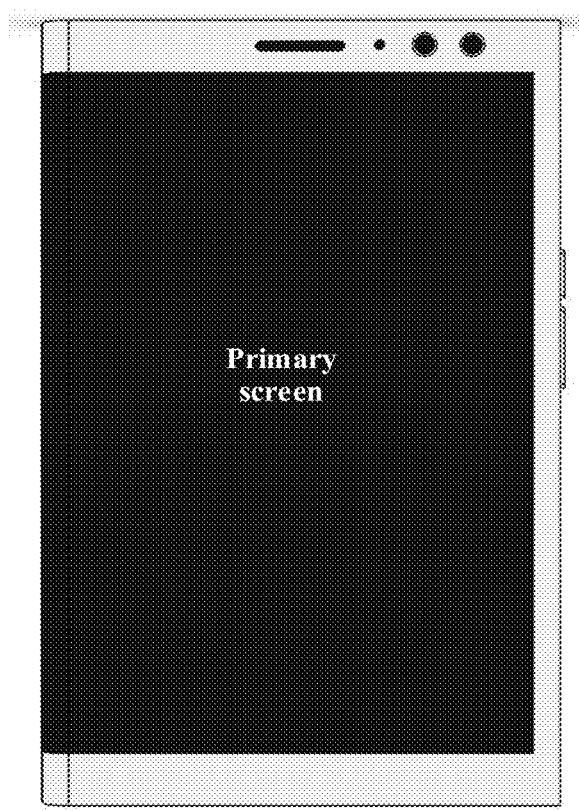
FIG. 10A and FIG. 10B are a schematic diagram of a scenario of an electronic device control method according to an embodiment of this disclosure.
Figure 10B:
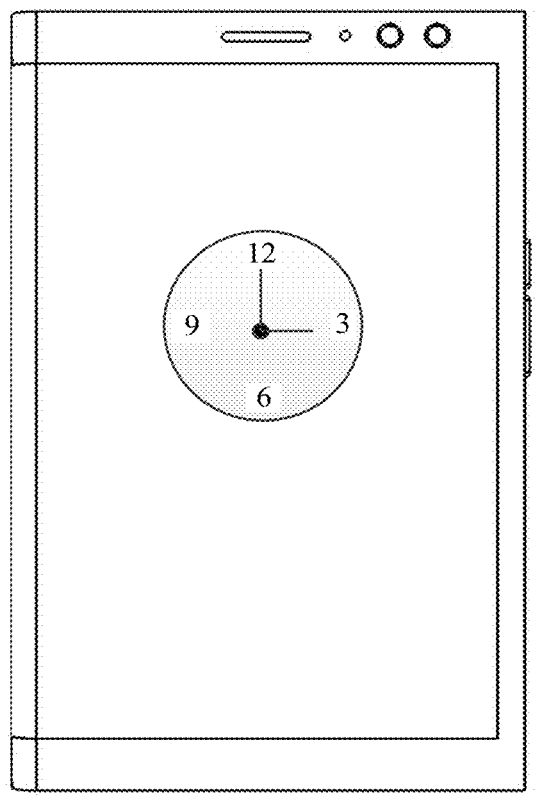
Figure 10E:
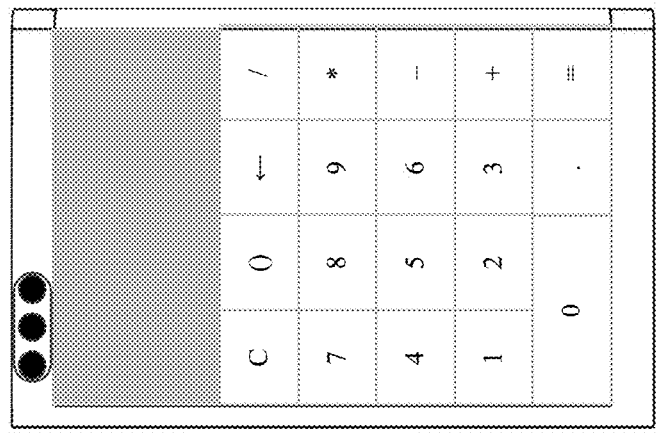
FIG. 10C, FIG. 10D, and FIG. 10E are a schematic diagram of a scenario of an electronic device control method according to an embodiment of this disclosure.

As shown in FIG. 10A, if the primary screen faces upward/faces the user, the display policy service determines that the primary screen currently needs to be lit up. In this case, the display policy service may notify the power manager service that a current display mode is a primary screen display mode. In this way, as shown in FIG. 10B, the power manager service may invoke a corresponding interface to power on the primary screen, and display a lock screen interface on the primary screen by using a display manager service.

Figure 10D:
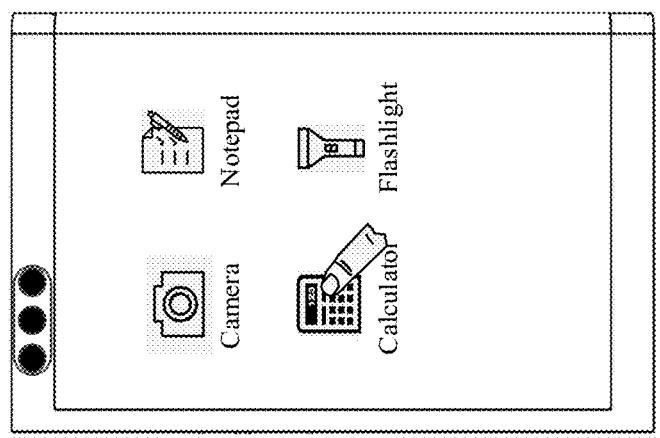
Figure 10C:
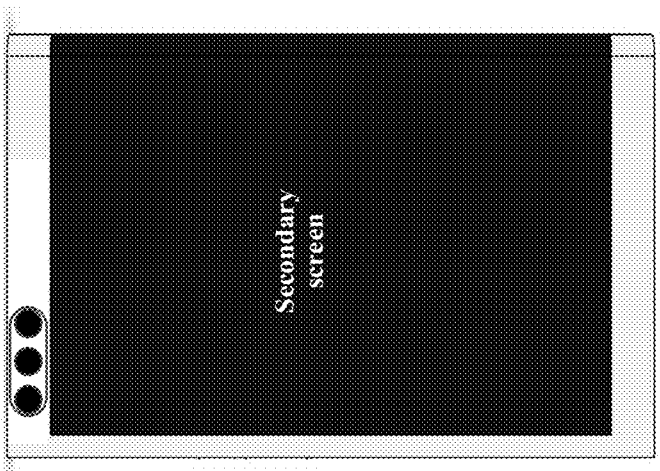

As described in FIG. 10C, if the secondary screen faces upward/faces the user, the display policy service determines that the secondary screen currently needs to be lit up. In this case, the display policy service may notify the power manager service that a current display mode is a secondary screen display mode. In this way, as shown in FIG. 10D, the power manager service may invoke a corresponding interface to power on the secondary screen, and display, on the secondary screen by using a display manager service, an icon of an application (for example, camera, Notepad, flashlight, or calculator) corresponding to non-unlocked opening. In this way, the user may tap, in FIG. 10D, an icon of an application that needs to be opened, for example, an icon of calculator, to open the application calculator in a locked state of the mobile phone, so that the mobile phone displays a calculator page shown in FIG. 10E.

In this way, if the user needs to unlock the mobile phone normally, the primary screen of the flexible display mobile screen faces upward, and then screen-on is triggered. In this case, only the primary screen is lit up, but the secondary screen is not lit up. If the user does not need to unlock the mobile phone but only expects to quickly open an application corresponding to non-unlocked opening, the secondary screen faces upward, and then screen-on is triggered. In this case, only the secondary screen is lit up, but the primary screen is not lit up. The user directly taps an icon of an application displayed on the secondary screen, to open the application. It can be learned that, compared with the conventional technology, in this embodiment, a quantity of operation steps of the user is reduced, and use experience of the user is improved.

The electronic device control method provided in this embodiment includes receiving a screen-on instruction entered by a user on the electronic device, when a first display screen of the electronic device is in a target orientation, displaying an icon of at least one first application on the first display screen, where the first application is an application that can be opened when the electronic device is in a locked state, and when a second display screen of the electronic device is in a target orientation, displaying a lock screen interface on the second display screen. In this way, when the user needs to open an application corresponding to non-unlocked opening, the first display screen of the mobile phone directly faces upward or faces the user, so that the user can open a corresponding application by tapping an icon on the first display screen. Because the user does not need to first unlock the mobile phone, and the user does not need to invoke a shortcut opening interface through a preset slide operation in a locked state, a quantity of operation steps performed by the user when the user opens the application corresponding to non-unlocked opening is reduced, and better use experience is provided for the user. In addition, in this embodiment, the application corresponding to non-unlocked opening and the lock screen interface are separately displayed. When an icon of the application corresponding to non-unlocked opening is displayed on the first display screen, the lock screen interface is not opened, and a lock screen function is not affected, to ensure security of another application.

Figure 11:
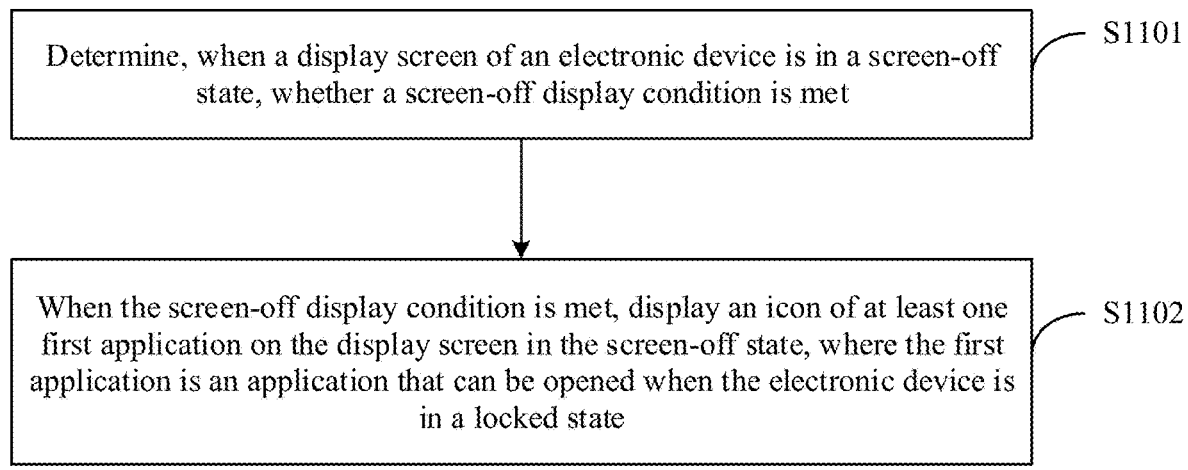
FIG. 11 is a schematic flowchart of an electronic device control method according to an embodiment of this disclosure.

FIG. 11 is a schematic flowchart of an electronic device control method according to an embodiment of this disclosure. As shown in FIG. 11, the method in this embodiment includes the following steps.

S1101: Determine, when a display screen of an electronic device is in a screen-off state, whether a screen-off display condition is met.

S1102: When the screen-off display condition is met, display an icon of at least one first application on the display screen in the screen-off state, where the first application is an application that can be opened when the electronic device is in a locked state.

The method in this embodiment is applicable to an electronic device including a display screen. There may be one or more display screens. For example, the method in this embodiment may be applied to the single-screen mobile phone shown in FIG. 2A and FIG. 2B. The method in this embodiment may also be applied to the dual-screen mobile phone shown in FIG. 2C and FIG. 2D. When the method is applied to the dual-screen mobile phone, the display screen may be a primary screen or a secondary screen of the mobile phone. The method in this embodiment may be further applied to the flexible display mobile phone shown in FIG. 3A, FIG. 3B, and FIG. 3C. When the method is applied to the flexible display mobile phone, the display screen may be an entire flexible display in an expanded state, or may be a primary screen or a secondary screen in an unexpanded state.

Screen-off display means that when the display screen of the mobile phone is in a screen-off (or black screen) state, some information may be displayed in some regions of the display screen. Screen-off display is applicable to an organic light-emitting diode (LED) (OLED) screen. The OLED screen can control individual pixels to display content. When screen-off display is performed, because most regions of the screen are displayed in black, pixels in only some regions need to illuminate. Therefore, power consumption can be greatly reduced, and power consumption caused by screen-off display can be almost negligible.

In this embodiment, when the display screen of the mobile phone is in the screen-off (or black screen) state, one or more icons of one or more first applications may be displayed on the display screen in the screen-off state. The first application is an application that can be opened in a locked state of the mobile phone, for example, the application corresponding to non-unlocked opening, the shortcut opening application, or the application that does not require privacy protection mentioned in the foregoing embodiments. The "application that can be opened in a locked state of the mobile phone" in this embodiment means that in a screen-off display state of the mobile phone, when the user taps an icon of the application, the mobile phone may be triggered to display a page of the application. For example, when the user taps an icon of Notepad, the mobile phone displays a page corresponding to Notepad.

Currently, during screen-off display, the mobile phone usually displays only some information for viewing by the user, for example, a date, time, a notification, and a message. To be specific, in a screen-off state, the user can conveniently view content displayed on the screen without waking up the screen or unlocking the mobile phone. However, the foregoing screen-off display content cannot provide an interaction function, that is, when the user touches or taps an icon of the content, neither waking up of the screen nor a page jump on the mobile phone is triggered. In this embodiment of this disclosure, the content/application that can be displayed in the screen-off state but cannot provide interaction is referred to as an application that cannot be opened in a locked state of the mobile phone.

In S1101, when the display screen of the mobile phone is in a screen-off (or black screen) state, the mobile phone may detect whether the screen-off display condition is met. The screen-off display condition may be a condition implemented by using software and hardware in the mobile phone, for example, whether the mobile phone supports screen-off display. The screen-off display condition may alternatively be a condition set by the user, for example, whether screen-off display is enabled on the mobile phone.

In some embodiments, the mobile phone may set that all scenarios meet the screen-off display condition. In this way, in this embodiment, the icon of the first application is displayed on the display screen in the screen-off state provided that the mobile phone is in the screen-off state. Therefore, the user can view the icons of the first applications anytime and anywhere, and operate the icons to trigger opening of the applications, so as to improve operation traversal of the user.

In some other embodiments, the mobile phone determines, by using detection data reported by at least one of an infrared sensor, a camera, an optical proximity sensor, or a touch panel of the display screen, whether the screen-off display condition is met. It may be understood that a current posture of the mobile phone may be determined by using the detection data collected by the sensor, for example, whether the display screen of the mobile phone faces the user, whether the mobile phone is in a preset grip state, whether the mobile phone is in a call state, or whether the mobile phone is in a pocket state. Further, whether the screen-off display condition is met may be determined based on the current posture of the mobile phone. For example, when the display screen of the mobile phone faces the user or the mobile phone is in the preset grip state, the mobile phone determines that the screen-off display condition is met, so that the icon of the first application is displayed on the display screen in the screen-off state. When the mobile phone is in the call state or the pocket state, the mobile phone determines that the screen-off display condition is not met, so that no content is displayed on the display screen in the screen-off state. In this way, power consumption caused by screen-off display can be further reduced.

For example, a camera may be disposed on the display screen side of the mobile phone. If the camera captures face information, the status monitoring service may determine that the current display screen of the mobile phone faces the user. For another example, an infrared sensor may be disposed on the display screen of the mobile phone. If the infrared sensor captures an infrared signal radiated by a human body, the status monitoring service may determine that the current display screen of the mobile phone faces the user. For another example, an optical proximity sensor may be further disposed on the display screen side of the mobile phone. If ambient light intensity detected by the optical proximity sensor falls within a preset interval, the status monitoring service may determine that the current display screen of the mobile phone is not blocked by a pocket, a human ear, or the like. For another example, the mobile phone may further report a current touch location of the user by using a touch panel, and may further determine, based on the touch location by using a preset grip algorithm, a grip posture in which the user currently grips the mobile phone. In this case, the status monitoring service may also determine a specific orientation of the display screen based on the grip posture of the mobile phone. It should be noted that the mobile phone may simultaneously use the foregoing one or more sensors to identify a specific posture of the mobile phone.

In a possible implementation, the method in this embodiment may further include receiving an application setting instruction entered by the user on the electronic device, where the application setting instruction is used to indicate opening attributes corresponding to applications of the electronic device, and the opening attributes include unlocked opening and non-unlocked opening. For example, the user may set an opening attribute for each application in a setting interface of the mobile phone, for example, set an opening attribute of an application such as e-bank, e-commerce, or social as unlocked opening, and set an opening attribute of an application such as Notepad, flashlight, camera, or calculator as non-unlocked opening. Further, the mobile phone determines the at least one first application from the applications of the electronic device according to the program setting instruction entered by the user. For example, the mobile phone determines an application such as Notepad, flashlight, camera, or calculator as the first application.

In this way, the user may further independently set an application that can be opened in a locked state, so that the user can perform setting based on a preference and a use habit of the user, to improve use experience of the user.

Figure 12C:
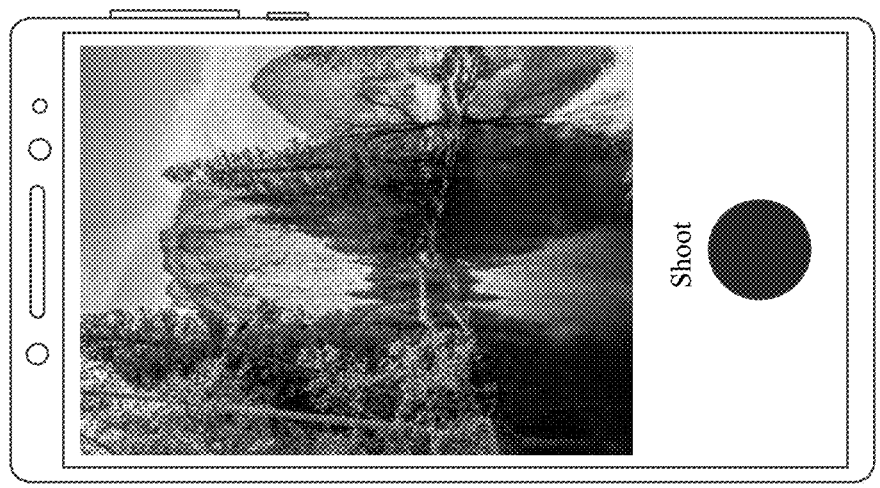
FIG. 12A, FIG. 12B, and FIG. 12C are a schematic diagram of a scenario of an electronic device control method according to an embodiment of this disclosure.
Figure 12B:
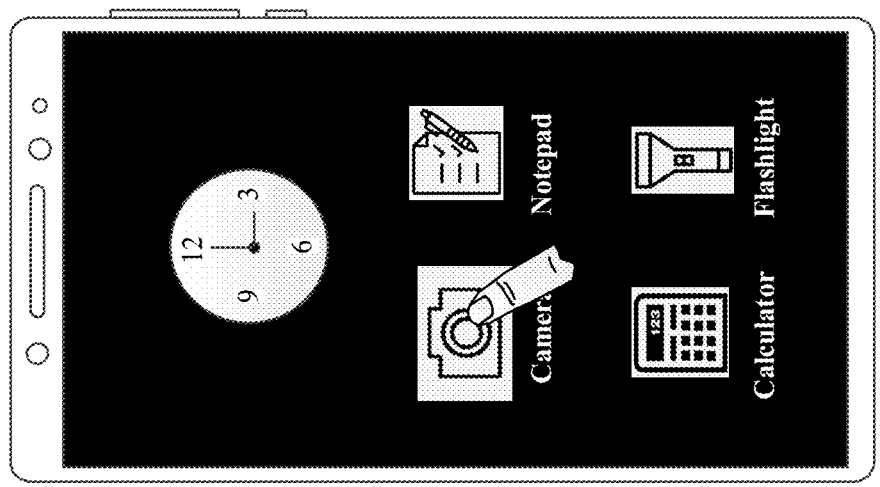
Figure 12A:
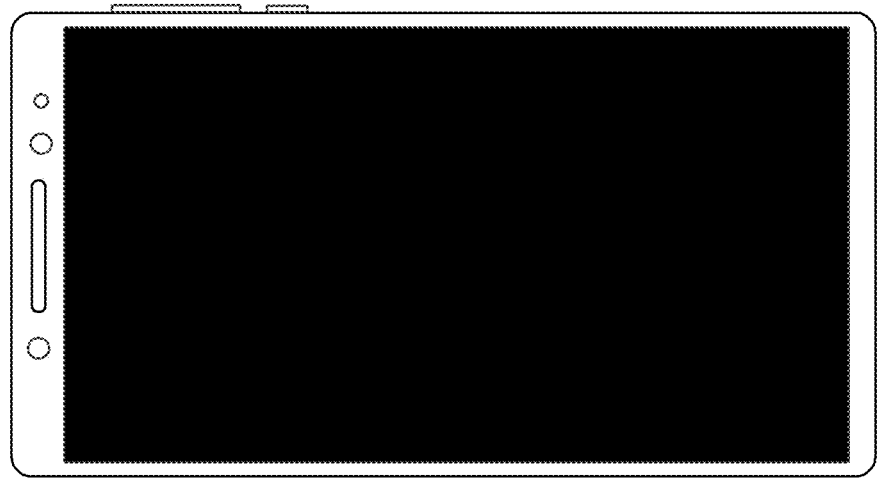

The following describes the control method in this embodiment with reference to FIG. 12A, FIG. 12B, and FIG. 12C by using the single-screen mobile phone shown in FIG. 2A and FIG. 2B as an example.

When the mobile phone is in a screen-off (or black screen) state, the status monitoring service may send a currently identified specific posture of the mobile phone to the display policy service. The display policy service may determine, based on the posture of the mobile phone, whether a screen-off display condition is met. When the display policy service determines that the screen-off display condition is not met, the display screen of the mobile phone remains the screen-off (or black screen) state, and no content is displayed on the display screen. When the display policy service determines that the screen-off display condition is met, the display policy service may notify the power manager service that a current display mode is a screen-off display mode. Further, the power manager service may invoke a corresponding interface to power on the display screen, and perform screen-off display on the display screen by using the display manager service.

As shown in FIG. 12A, if the screen-off display condition is not met, the display screen of the mobile phone remains the screen-off state, and no content is displayed on the display screen. After the screen-off display condition is met (for example, the mobile phone detects a preset grip posture, the user takes the mobile phone out of a pocket, or the mobile phone faces the user), as shown in FIG. 12B, an icon of at least one first application (for example, camera, Notepad, calculator, or flashlight) is displayed on the display screen in the screen-off state. In this way, the user may perform a preset operation on an icon of a target application. The preset operation has two functions: waking up the screen in the screen-off state, and opening the target application. To avoid an accidental touch of the user, the preset operation may be one of the following: a double-tap operation, a continuous-tap operation, a knuckle-tap operation, and a slide operation. In this case, after detecting the preset operation entered by the user on the icon of the target application, the mobile phone displays a page of the target application on the display screen. For example, the user double-taps an icon of camera in FIG. 12B, to open the application camera in a locked state of the mobile phone, so that the mobile phone displays a camera shooting page shown in FIG. 12C.

It should be noted that, in this embodiment, when the user double-taps the icon of the first application to enter the application, the mobile phone is still in the locked state. For example, as shown in FIG. 12C, on the camera shooting page, the user can only take a photo but cannot browse an album, so that security in a non-unlocked state is ensured.

In addition, in FIG. 12A, FIG. 12B, and FIG. 12C, a single-screen mobile phone is used as an example for illustration. It should be understood that the method in this embodiment is further applicable to a dual-screen mobile phone and a flexible display mobile phone. For example, in a screen-off state of the dual-screen mobile phone, an icon of at least one first application is displayed on a primary screen or a secondary screen in the screen-off state. In a screen-off state of the flexible display mobile phone, if a flexible display is in an expanded state, an icon of at least one first application is displayed on the flexible display in the screen-off state, or if a flexible display is in an unexpanded state, an icon of at least one first application is displayed on a primary screen or a secondary screen in the screen-off state. A specific implementation process is similar to that in of the single-screen mobile phone. Details are not described herein again.

The electronic device control method provided in this embodiment includes determining, when the display screen of the electronic device is in a screen-off state, whether a screen-off display condition is met, and when the screen-off display condition is met, displaying an icon of at least one first application on the display screen in the screen-off state, where the first application is an application that can be opened when the electronic device is in a locked state. In this way, the user can see, on the display screen in the screen-off state, an icon of an application corresponding to non-unlocked opening, so that the user can open the corresponding application by operating the icon. Because the user does not need to first unlock the mobile phone, and the user does not need to invoke a shortcut opening interface through a preset slide operation in a locked state, a quantity of operation steps performed by the user when the user opens the application corresponding to non-unlocked opening is reduced, and better use experience is provided for the user.

Figure 13:
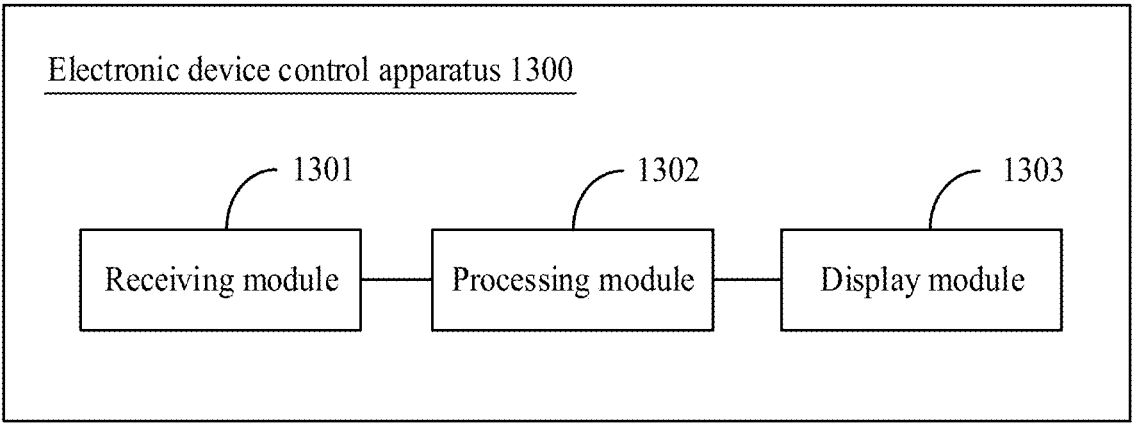
FIG. 13 is a schematic diagram of a structure of an electronic device control apparatus according to an embodiment of this disclosure.

FIG. 13 is a schematic diagram of a structure of an electronic device control apparatus according to an embodiment of this disclosure. The apparatus in this embodiment may be disposed in an electronic device. As shown in FIG. 13, the electronic device control apparatus 1300 in this embodiment includes a receiving module 1301, a processing module 1302, and a display module 1303.

When the electronic device in this embodiment includes a first display screen and a second display screen, the receiving module 1301 is configured to receive a screen-on instruction entered by a user on the electronic device, the processing module 1302 is configured to determine orientations of the first display screen and the second display screen of the electronic device, and the display module 1303 is configured to, when the first display screen of the electronic device is in a target orientation, display an icon of at least one first application on the first display screen, where the first application is an application that can be opened when the electronic device is in a locked state, and when the second display screen of the electronic device is in a target orientation, display a lock screen interface on the second display screen.

In a possible implementation, a gravity sensor is disposed on the electronic device. The processing module 1302 is further configured to, based on a signal collected by the gravity sensor, determine that the first display screen is in the target orientation, or determine that the second display screen is in the target orientation.

In a possible implementation, the display module 1303 is further configured to display the icon of the at least one first application on the first display screen in a lit state.

In a possible implementation, the display module 1303 is further configured to display the icon of the at least one first application on the first display screen in a screen-off state.

In a possible implementation, the receiving module 1301 is further configured to receive an opening instruction entered by the user on an icon of a target application, where the target application is any application in the at least one first application, and the display module is further configured to display a page of the target application on the first display screen according to the opening instruction.

In a possible implementation, the first display screen and the second display screen are different display regions of a flexible display in an unexpanded state. The processing module 1302 is further configured to detect an included angle between the first display screen and the second display screen, and determine, based on the included angle between the first display screen and the second display screen, that the flexible display is in an expanded state or an unexpanded state.

In a possible implementation, the receiving module 1301 is further configured to receive a display screen setting instruction entered by the user on the electronic device, where the display screen setting instruction is used to indicate display usage of display screens of the electronic device, and the display usage includes displaying the lock screen interface and displaying the icon of the at least one first application, and the processing module 1302 is further configured to determine the first display screen and the second display screen from the display screens of the electronic device according to the display screen setting instruction.

In a possible implementation, the receiving module 1301 is further configured to receive an application setting instruction entered by the user on the electronic device, where the application setting instruction is used to indicate opening attributes corresponding to applications of the electronic device, and the opening attributes include unlocked opening and non-unlocked opening, and the processing module 1302 is further configured to determine the at least one first application from the applications of the electronic device according to the program setting instruction.

When the electronic device in this embodiment includes a display screen, the processing module 1302 is configured to determine, when the display screen of the electronic device is in a screen-off state, whether a screen-off display condition is met, and the display module 1303 is configured to, when the screen-off display condition is met, display an icon of at least one first application on the display screen in the screen-off state, where the first application is an application that can be opened when the electronic device is in a locked state.

In a possible implementation, the receiving module 1301 is configured to receive an opening instruction entered by a user on an icon of a target application, where the target application is any application in the at least one first application, and the display module 1303 is further configured to display a page of the target application on the display screen according to the opening instruction.

In a possible implementation, the processing module 1302 is further configured to determine, by using detection data reported by at least one of an infrared sensor, a camera, an optical proximity sensor, or a touch panel of the display screen, whether the screen-off display condition is met.

In a possible implementation, the processing module 1302 is further configured to, if the infrared sensor of the electronic device captures an infrared signal radiated by a human body, determine that the screen-off display condition is met, if the camera of the electronic device captures face information, determine that the screen-off display condition is met, if the optical proximity sensor of the electronic device detects that ambient light intensity falls within a preset interval, determine that the screen-off display condition is met, or if locations and a quantity of touch points on the display screen match a preset grip posture, determine that the screen-off display condition is met.

In a possible implementation, the receiving module 1301 is further configured to detect a preset operation entered by the user on the icon of the target application, where the preset operation is any one of the following a double-tap operation, a continuous-tap operation, a knuckle-tap operation, and a slide operation.

In a possible implementation, the receiving module 1301 is further configured to receive an application setting instruction entered by the user on the electronic device, where the application setting instruction is used to indicate opening attributes corresponding to applications of the electronic device, and the opening attributes include unlocked opening and non-unlocked opening, and the processing module 1302 is further configured to determine the at least one first application from the applications of the electronic device according to the program setting instruction.

The electronic device control apparatus in this embodiment may be configured to perform the technical solution in any one of the foregoing method embodiments. An implementation principle and a technical effect of the electronic device control apparatus are similar to those of the method embodiments. Details are not described herein again.

Figure 14:
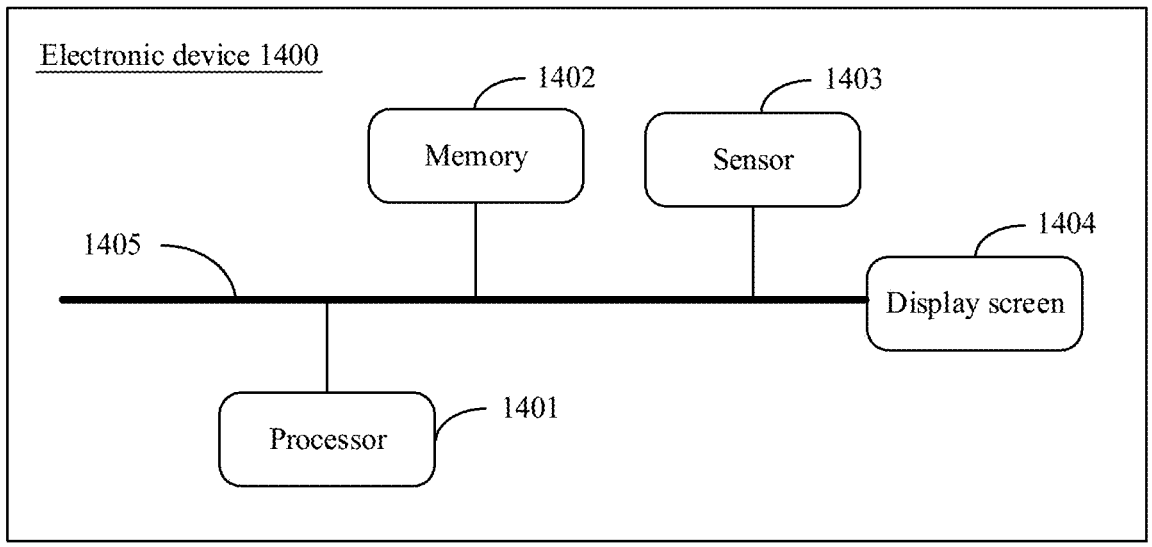
FIG. 14 is a schematic diagram of a structure of an electronic device according to an embodiment of this disclosure.

FIG. 14 is a schematic diagram of a structure of an electronic device according to an embodiment of this disclosure. The electronic device includes one or more processors 1401, one or more memories 1402, one or more sensors 1403, and a display screen 1404. The display screen 1404 may include a first display screen and a second display screen. The memory 1402 stores one or more applications (not shown) and one or more computer programs (not shown). The foregoing devices may be connected through one or more communications buses 1405. The one or more computer programs are stored in the memory and are configured to be executed by the one or more processors. The one or more computer programs include instructions, and the instructions may be used to perform the steps in the foregoing embodiments. All related content of the steps in the foregoing method embodiments may be cited in function descriptions of corresponding physical components. Details are not described herein again.

For example, the processor 1401 may be the processor 110 shown in FIG. 1, the memory 1402 may be the internal memory 121 and/or the external memory 120 shown in FIG. 1, and the sensor 1403 may be a gyro sensor 180B, an acceleration sensor 180E, or an optical proximity sensor 180G in the sensor module 180 shown in FIG. 1, or may be one or more of an infrared sensor, a Hall effect sensor, and the like. This is not limited in this embodiment of this disclosure.

Based on the foregoing descriptions of the implementations, a person skilled in the art may clearly understand that for the purpose of convenient and brief descriptions, division into the foregoing functional modules is merely used as an example for illustration. In actual application, the foregoing functions can be allocated to different functional modules for implementation based on a requirement, that is, an inner structure of an apparatus is divided into different functional modules to implement all or some of the functions described above. For detailed working processes of the foregoing system, apparatus, and unit, refer to corresponding processes in the foregoing method embodiments. Details are not described herein again.

Functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the embodiments of this disclosure essentially, or the part contributing to the conventional technology or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this disclosure. The foregoing storage medium includes any medium that can store program code, such as a flash memory, a removable hard disk, a read-only memory, a RAM, a magnetic disk, or an optical disc.

The foregoing descriptions are merely specific implementations of the embodiments in this disclosure, but are not intended to limit the protection scope of the embodiments in this disclosure. Any variation or replacement within the technical scope disclosed in the embodiments in this disclosure shall fall within the protection scope of the embodiments in this disclosure. Therefore, the protection scope of the embodiments of this disclosure shall be subject to the protection scope of the claims.

What is claimed is:

1. A method, comprising:
receiving a screen-on instruction on an electronic device;
monitoring a first status of a first display screen of the electronic device, wherein the first status comprises that the first display screen faces a user;
monitoring a second status of a second display screen of the electronic device, wherein the second status comprises that the second display screen faces the user;
displaying a first icon of at least one first application on the first display screen when the first display screen faces the user, wherein the at least one first application can be opened when the electronic device is in a locked state; and
displaying a lock screen interface on a second display screen of the electronic device when the second display screen faces the user.

2. The method of claim 1, wherein monitoring the first status of the first display screen or the second status of the second display screen comprises sensing a change in posture of the electronic device, and wherein after receiving the screen-on instruction, the method further comprises:
displaying, based on the posture, when the first display screen faces the user, and when the second display screen faces the user.

3. The method of claim 1, further comprising displaying the first icon on the first display screen in a lit state.

4. The method of claim 1, further comprising displaying the first icon on the first display screen in a screen-off state.

5. The method of claim 1, wherein after displaying the first icon, the method further comprises:
receiving on a second icon of a target application, an opening instruction, wherein the target application is one of the at least one first applications; and
displaying, according to the opening instruction, a page of the target application on the first display screen.

6. The method of claim 1, wherein the first display screen and the second display screen are different display regions of a flexible display of the electronic device, and wherein after receiving the screen-on instruction, the method further comprises:
detecting an included angle between the first display screen and the second display screen; and
determining, based on the included angle, whether the flexible display is in an expanded state or an unexpanded state.

7. The method of claim 1, further comprising:
receiving a display screen setting instruction indicating display usage of display screens of the electronic device, wherein the display usage comprises displaying the lock screen interface and displaying the first icon; and
determining, from the display screens and according to the display screen setting instruction, the first display screen and the second display screen.

8. The method of claim 1, further comprising:
receiving an application setting instruction indicating opening attributes corresponding to applications of the electronic device, wherein the opening attributes comprise unlocked opening and non-unlocked opening; and
determining, according to the application setting instruction, the at least one first application from the applications.

9. An electronic device comprising:
a first display screen;
a second display screen;
a status monitoring circuit, wherein the status monitoring circuit is configured to detect a first status wherein the first display screen faces a user, and to detect a second status wherein the second display screen faces the user; and
one or more processors coupled to the first display screen and the second display screen and the status monitoring circuit, and configured to:
receive a screen-on instruction;
cause, based on the first status, the first display screen to display a first icon of at least one first application, wherein the at least one first application is configured to be opened when the electronic device is in a locked state; and
cause, based on the second status, the second display screen to display a lock screen interface.

10. The electronic device of claim 9, further comprising a sensor disposed on the electronic device and coupled to the status monitoring circuit, wherein after receiving the screen-on instruction, the one or more processors are further configured to:
receive, from the status monitoring circuit, a signal; and
display, based on the signal, when the first display screen faces the user and when the second display screen faces the user.

11. The electronic device of claim 9, wherein the one or more processors are further configured to cause the first display screen to display the first icon in a lit state and in a screen-off state.

12. The electronic device of claim 9, wherein the status monitoring circuit comprises one or more:
infrared sensor;
camera;
optical proximity sensor; or
touch panel.

13. The electronic device of claim 9, wherein after displaying the first icon, the one or more processors are further configured to:
receive, from the user on a second icon of a target application, an opening instruction, wherein the target application is one of the at least one first applications; and
cause the first display screen to display, according to the opening instruction, a page of the target application.

14. The electronic device of claim 9, wherein the first display screen and the second display screen are different display regions of a flexible display of the electronic device, and wherein after receiving the screen-on instruction, the one or more processors are further configured to detect, based on an included angle between the first display screen and the second display screen whether the flexible display is in an expanded state or an unexpanded state.

15. The electronic device of claim 9, wherein the one or more processors are further configured to:
receive a display screen setting instruction for display usage of display screens of the electronic device, wherein the display usage comprises displaying the lock screen interface and displaying the first icon; and
enable, according to the display screen setting instruction, the first display screen and the second display screen.

16. The electronic device of claim 9, wherein the one or more processors are further configured to:
receive an application setting instruction for opening attributes corresponding to applications of the electronic device, wherein the opening attributes comprise unlocked opening and non-unlocked opening; and
enable, according to the application setting instruction, the at least one first application.

17. A computer program product comprising computer-executable instructions stored on a non-transitory computer-readable storage medium and that, when executed by one or more processors, cause an electronic device to:
receive, from a user, a screen-on instruction;
monitor a first status of a first display screen of the electronic device, wherein the first status comprises that the first display screen faces a user;
monitor a second status of a second display screen of the electronic device, wherein the second status comprises that the second display screen faces the user;
display an icon of at least one first application on a first display screen of the electronic device when the first display screen faces the user, wherein the first application is configured to be opened when the electronic device is in a locked state; and
display a lock screen interface on the second display screen of the electronic device when the second display screen faces the user.

18. The computer program product of claim 17, wherein the computer-executable instructions further cause the electronic device to:
sense a change in posture of the electronic device; and
display, based on the posture, when the first display screen faces the user, and when the second display screen faces the user.

19. The computer program product of claim 17, wherein the computer-executable instructions further cause the electronic device to display the icon on the first display screen in a lit state.

20. The computer program product of claim 17, wherein the computer-executable instructions further cause the electronic device to display the icon on the first display screen in a screen-off state.

* * * * *

UNITED STATES PATENT AND TRADEMARK OFFICE
CERTIFICATE OF CORRECTION

PATENT NO. : 11,994,918 B2
APPLICATION NO. : 17/707268
DATED : May 28, 2024
INVENTOR(S) : Yan Ran

It is certified that error appears in the above-identified patent and that said Letters Patent is hereby corrected as shown below:

On the Title Page

Page 2, Item [56] "IN 107765835 A 3/2018" should read "CN 107765835 A 3/2018"

Signed and Sealed this
Ninth Day of July, 2024

Katherine Kelly Vidal
*Director of the United States Patent and Trademark Office*